(12) United States Patent
Aksit

(10) Patent No.: US 10,190,432 B2
(45) Date of Patent: Jan. 29, 2019

(54) BRUSH SEAL ASSEMBLY

(71) Applicant: DOOSAN HEAVY INDUSTRIES CONSTRUCTION CO., LTD., Gyeongsangnam-do (KR)

(72) Inventor: Mahmut Faruk Aksit, Istanbul (TK)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 269 days.

(21) Appl. No.: 14/742,448

(22) Filed: Jun. 17, 2015

(65) Prior Publication Data
US 2015/0361815 A1    Dec. 17, 2015

(30) Foreign Application Priority Data
Jun. 17, 2014 (KR) .................. 10-2014-0073703
Jun. 17, 2014 (KR) .................. 10-2014-0073706

(51) Int. Cl.
  *F01D 11/02* (2006.01)
  *F16J 15/3288* (2016.01)

(52) U.S. Cl.
  CPC ........... *F01D 11/02* (2013.01); *F16J 15/3288* (2013.01); *F05D 2240/56* (2013.01)

(58) Field of Classification Search
  CPC ...... F01D 11/02; F01D 11/04; F05D 2240/56; F05D 2240/571; F16J 15/3284; F16J 15/3288
  USPC ................ 415/173.3, 174.2, 174.5; 277/355
  See application file for complete search history.

(56) References Cited

U.S. PATENT DOCUMENTS

| | | | |
|---|---|---|---|
| 5,884,918 A * | 3/1999 | Basu ................ | F16J 15/3288 277/355 |
| 6,790,001 B2 | 9/2004 | Turnquist et al. | |
| 2004/0018085 A1 | 1/2004 | Dhar et al. | |
| 2005/0006851 A1 | 1/2005 | Addis | |
| 2007/0069475 A1* | 3/2007 | Adis ................ | F16J 15/3288 277/355 |
| 2007/0187900 A1 | 8/2007 | Datta | |
| 2009/0315272 A1 | 12/2009 | Kasahara et al. | |
| 2010/0054924 A1* | 3/2010 | Uyama ............. | F01D 11/001 415/173.1 |

(Continued)

FOREIGN PATENT DOCUMENTS

| EP | 0617216 A1 | 9/1994 |
| EP | 2351952 A1 | 8/2011 |

(Continued)

OTHER PUBLICATIONS

European Office Action dated Nov. 18, 2015 in corresponding European patent application No. 15172503.3-1751.

(Continued)

*Primary Examiner* — Marina Tietjen
*Assistant Examiner* — Paul J Gray
(74) *Attorney, Agent, or Firm* — Invenstone Patent, LLC

(57) ABSTRACT

A brush seal assembly is operable to seal a gap between a diaphragm and a rotor of a turbine. A brush seal assembly includes: a brush configured to have one end inserted into one side of a diaphragm and the other end protruding toward a rotor; a support strip configured to support one side of the brush; and a back plate configured to support one side of the support strip.

12 Claims, 23 Drawing Sheets

(56) References Cited

U.S. PATENT DOCUMENTS

| | | | |
|---|---|---|---|
| 2010/0066024 A1* | 3/2010 | Burdgick | ............ F01D 11/001 |
| | | | 277/301 |
| 2012/0326392 A1 | 12/2012 | Zheng et al. | |
| 2014/0241877 A1 | 8/2014 | Uehara et al. | |

FOREIGN PATENT DOCUMENTS

| | | |
|---|---|---|
| JP | 07-055018 A | 3/1995 |
| JP | 11-153230 A | 6/1999 |
| JP | 2003518599 A | 6/2003 |
| JP | 2007-092997 A | 4/2007 |
| JP | 2009-024872 A | 2/2009 |
| JP | 2011-137543 A | 7/2011 |
| JP | 2011521182 A | 7/2011 |
| KR | 10-2014-0049607 A | 4/2014 |

OTHER PUBLICATIONS

Korean Office Action dated Aug. 28, 2015 in corresponding KR patent application No. 10-2014-0073703.
Korean Office Action dated Aug. 28, 2015 in corresponding KR patent application No. 10-2014-0073706.

* cited by examiner

BRUSH SEAL ASSEMBLY

CROSS-REFERENCE TO RELATED APPLICATIONS

This application claims priority to Korean Patent Application Nos. 10-2014-0073703 and 10-2014-0073706 filed on Jun. 17, 2014 the disclosures of which are incorporated herein by reference in their entirety.

BACKGROUND

Exemplary embodiments relate to a brush seal assembly, and more particularly, to a brush seal assembly which seals a gap between a diaphragm and a rotor of a turbine.

A turbine is a power generation apparatus which converts heat energy of a fluid like gas, steam, or the like into a torque which is mechanical energy and includes a rotor which has a plurality of buckets to rotate as a shaft by the fluid and a casing which is installed to enclose a circumference of the rotor and is provided with a plurality of diaphragms.

A gas turbine may be configured to include a compressor, a combustor, and a turbine, in which the compressor rotates to suck and compress external air and then deliver the compressed air to the combustor which mixes the compressed air with fuel to perform combustion. High-temperature and high-pressure gas which is generated from the combustor rotates the rotor of the turbine while passing through the turbine to drive a power generator.

In the case of a steam turbine, a high pressure turbine, an intermediate pressure turbine, and a low pressure turbine are connected to one another in series or in parallel to rotate the rotor. When the high pressure turbine, the intermediate pressure turbine, and the low pressure turbine have a serial structure, the high pressure turbine, the intermediate pressure turbine, and the low pressure turbine may share one rotor.

In the steam turbine, each turbine includes the diaphragm and the bucket based on the rotor inside the casing and rotates the rotor while steam passing through the diaphragm and the bucket to drive the power generator.

The gas turbine and the steam turbine has a structure in which a rotating body (for example, rotor) relatively rotates with respect to a fixing body (for example, diaphragm), and therefore the high-temperature and high-pressure gas may be leaked to the gap between the fixing body and the rotating body. The fluid leakage is one cause of reduction in efficiency due to a power loss.

Efforts to reduce the fluid leakage occurring between the rotating body and the fixing body have been continuously conducted.

To reduce the fluid leakage, there is a need to reduce the gap between the fixing body and the rotating body, but there are restrictions in making the gap narrow.

For example, in the case in which the gap is excessively narrow, an interference may occur between the rotating body and the fixing body when the rotating body rotates and thus vibrations occurs due to rubbing, which leads to a serious damage to the turbine.

BRIEF SUMMARY

Embodiments provide a brush seal assembly that may reduce heat generation and abrasion due to rubbing with a rotor.

Certain embodiments provide a brush seal assembly that may improve a sealing efficiency to increase turbine efficiency.

Objects and advantages of the embodiments can be understood and become apparent by the following description.

In accordance with an embodiment, a brush seal assembly includes: a brush configured to have one end inserted into one side of a diaphragm and the other end protruding toward a rotor; a support strip configured to support one side of the brush; and a back plate configured to support one side of the support strip.

The brush seal assembly may further include a back plate configured to support the other side of the brush.

One side of the diaphragm may be provided with a brush insertion groove, one end of the brush and one end of the support strip may be fixed to a middle portion of the brush insertion groove by a welding, and both sides of the brush and the support strip may be each supported by the back plate.

The support strip may be provided with at least one flexed part.

A pressure pocket may be formed between the flexed part and the brush.

The support strip may include a support part supporting one side of the brush and a bending part bent to enclose one end of the brush in one end of the support part.

The support strip may further include an extension extending from one end of the bending part to partially cover the other side of the brush.

The support part may be provided with at least one flexed part and a pressure pocket may be formed between the flexed part and the brush.

The other side of the brush may be interposed with an anchoring member which presses and supports the extension to the brush.

One side of the diaphragm may be provided with a brush insertion groove into which the brush is inserted and one side of the brush insertion groove may be provided with an anchoring member insertion groove into which the anchoring member is inserted.

The anchoring member insertion groove may be stepped from the one side of the brush insertion groove toward the rotor.

The rotor opposing end of the support strip may be disposed to be more spaced outward in a radius direction of the rotor than the other end of the brush.

The rotor opposing end of the back plate may be disposed to be more spaced outward in the radius direction of the rotor than the rotor opposing end of the support strip.

The support strip may include a first support strip which extends from a lower end thereof to a predetermined section of an upper portion thereof and is made of a material having an elastic recovering force and a second support strip which extends from the first support strip to an upper end thereof and is made of material different from the first support strip.

In the support strip, the first support strip facing the brush based on a vertical direction may be classified by a material having an elastic restoring force and the second support strip facing the back plate may be made of a material different from the first support strip.

In the support strip, the first support strip extending from a lower end thereof to a predetermined section of an upper portion thereof and facing the brush may be classified by a material having an elastic restoring force and the rest second support strip may be made of a material different from the first support strip.

The back plate facing the support strip provided with the pressure pocket may adhere to the rounded outer circumferential surface of the pressure pocket.

The pressure pocket may be formed to have different radii along a length direction.

The anchoring member may have substantially a rectangular shape to have one surface adhered to an outer circumferential surface of an extension extending from the support strip and the other surface fitted in an anchoring member insertion groove in a complete adhering state.

In accordance with an embodiment, a brush seal assembly includes: a brush configured to have one end inserted into one side of a diaphragm and the other end protruding toward a rotor; a support strip configured to support one side of the brush; and an anchoring member configured to support the other side of the brush.

The support strip may include a support part supporting one side of the brush and a bending part bent from one end of the support part to enclose one end of the brush, and the other end of the support part may be positioned inside the brush.

The support strip may further include an extension extending from one end of the bending part to partially cover the other side of the brush.

One side of the diaphragm may be provided with a mounting groove, one side of the mounting groove may be inserted with the brush, the other side of the mounting groove may be inserted with the anchoring member, and the mounting groove may include a brush insertion groove into which the brush is inserted and an anchoring member insertion groove into which the anchoring member is inserted to press one side of the extension.

In accordance with an embodiment, a brush seal assembly includes: a brush configured to have one end inserted into one side of a diaphragm and the other end protruding toward a rotor; a support strip configured to support one side of the brush and include a support part supporting one side of the brush, at least one flexed part formed at the support part, and a bending part bent from one end of the support part to enclose one end of the brush; and an anchoring member configured to support one side of the support strip, wherein the one side of the brush is stepwise stacked with the at least one support strip.

In accordance with an embodiment, a brush seal assembly includes: a brush configured to have one end inserted into a mounting groove formed at one side of a diaphragm and the other end protruding toward the rotor; a support strip configured to include a first support part supporting one side of the brush and a first bending part bent from one end of the first support part to partially enclose one end of the brush; an anchoring member configured to be inserted into the mounting groove to face the brush so as to press and support one side of an upper end of the brush; and an auxiliary strip configured to support one side of the first support part and to be interposed between the support strip and the anchoring member, wherein the auxiliary strip includes a second support part supporting one side of the first support part and a second bending part bent from one end of the second support part to enclose one side of an outer circumferential surface of the anchoring member.

It is to be understood that both the foregoing general description and the following detailed description are exemplary and explanatory and are intended to provide further explanation of the embodiments.

BRIEF DESCRIPTION OF THE DRAWINGS

The above and other objects, features and other advantages of the embodiments will be more clearly understood from the following detailed description taken in conjunction with the accompanying drawings, in which.

DETAILED DESCRIPTION

Detailed exemplary embodiments will be described with reference to the accompanying drawings.

In a steam or gas turbine, since the rotating body and the fixing body are applied with heat due to high-temperature steam introduced from a boiler, when the steam turbine is operated and the operation thereof stops, the steam turbine is expanded or contracted from several mm to tens of mm depending on a position. In this case, the rotating body and the fixing body are differently expanded due to different characteristics of a material and are expanded in a different direction depending on a structure of the turbine to cause the interference while the rotor and the stator are operated, and as a result, the rubbing may occur.

Typically, a labyrinth seal may be used to promote sealing. Also, a technology of applying a brush seal in which the brush is coupled with the labyrinth seal to reduce the gap between the fixing body and the rotating body and promote sealing in a form which the stator and the rotor flexibly contact each other.

Figure 1:
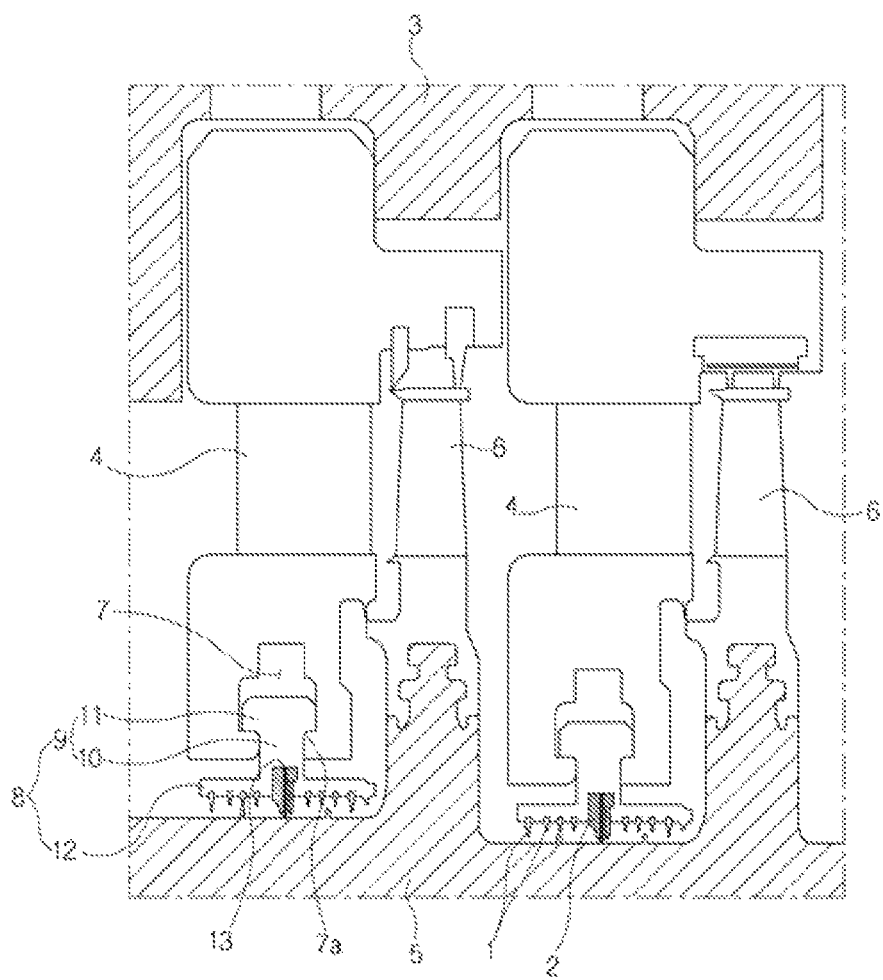
FIG. 1 is a schematic diagram illustrating an example in which a labyrinth seal and a brush seal are applied to a gap between a fixing body and a rotating body of a steam turbine.

FIG. 1 illustrates an example in which a labyrinth seal 1 and a brush seal is applied between the fixing body and the rotating body of the steam turbine, in which the fixing body includes a casing 3 and a diaphragm 4 and the rotating body includes a rotor 5 and a bucket 6.

The diaphragm 4 is fixedly coupled with the casing 3 and is disposed to be adjacent to the bucket 6 and the bucket 6 integrally rotates as a shaft with the rotor 5 in the state in which it is adjacent to the diaphragm 4.

There is a need to seal a gap between the diaphragm 4 and the bucket 6 and a gap between the diaphragm 4 and the rotor 5 for airtightness.

Figure 2:
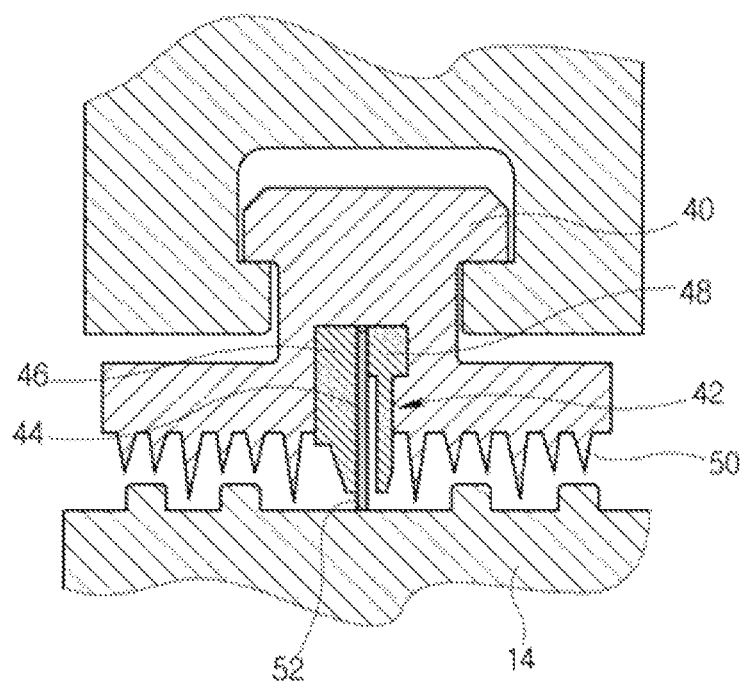
FIG. 2 is a schematic diagram illustrating an example of a brush seal assembly according to the related art.

FIG. 2 illustrates an example in which a bottom surface of a seal ring 40 is provided with a labyrinth seal 50 and a brush seal 42 and an end 52 of the brush 44 contacts an outer circumferential surface of the rotor 14.

The brush seal includes a brush 44 and a pair of plates 46 and 48 which are disposed at front and back sides of the brush 44 to support the brush 4, in which to prevent heat from being generated when the plates 46 and 48 contact the rotor 14, ends of the plates 46 and 48 are positioned to be spaced apart from the outer circumferential surface of the rotor 14.

In this case, when a gap between the ends of the plates 46 and 48 and the rotor 14 is wide, a fluid quantity leaked through the gap may be increased and when the gap is narrow, heat and vibrations may occur due to the rubbing of the plates 46 and 48 with the rotor 14.

Figure 3:
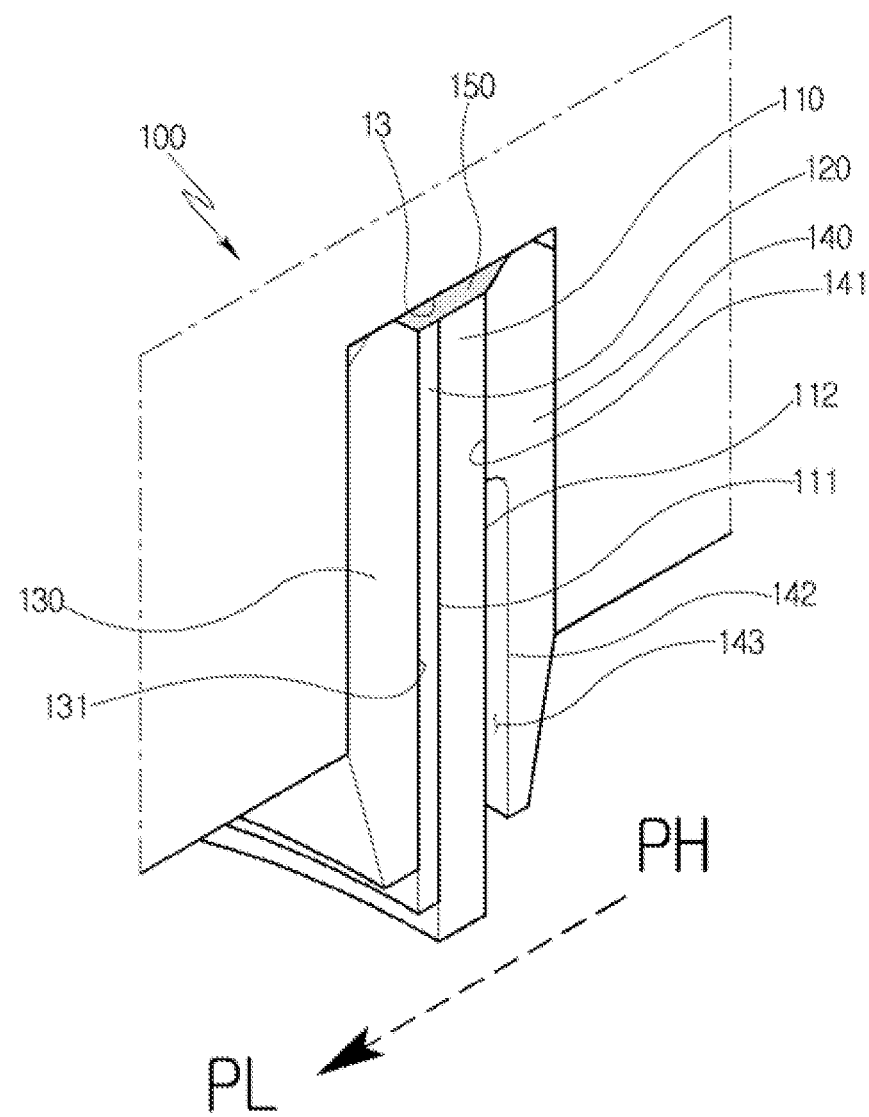
FIG. 3 is a schematic diagram of a brush seal assembly according to a first exemplary embodiment.

FIG. 3 is a schematic diagram of a brush seal assembly according to a first exemplary embodiment.

Referring to FIG. 1 or 3, one surface of a diaphragm 4 which faces a rotor 5 is provided with a seal mounting groove 7 and a sealing body 8 is coupled with a seal mounting groove 7.

The sealing body 8 generally has a ring shape enclosing an outer side of the rotor 5 and includes a coupling part 9 inserted into the seal mounting groove 7 and a body part 12 having a width expanded from one side of the coupling part 9 toward an outer circumferential surface of the rotor 5.

The coupling part 9 of the sealing body 8 includes an insertion part 10 inserted into the seal mounting groove 7 and a locking part 11 which has a width expanded from one side of the insertion part 10 and is locked to a step 7a of the seal mounting groove 7.

The body part 12 is formed at the other side of the insertion part 10 while having an expanded width to face the locking part 11 and the plurality of labyrinth seals are 1 protrudedly formed at a bottom surface of the body part 12 while being spaced apart from each other along a width direction.

A center of the bottom surface of the body part 12 is provided with a mounting groove 13 and a brush seal assembly 100 according to a first exemplary embodiment. One end may be mounted at the mounting groove 13.

The brush seal assembly 100 includes a brush 110, a support strip supporting one side of the brush 100, and a pair of back plates 130 and 140 supporting one side of the support strip 120 and the other side of the brush 110.

The brush 110 includes a plurality of bristles, in which standards like a thickness, and the like of the bristle may be appropriately selected if necessary.

One end of the brush 110 is inserted into the mounting groove 13 and the other end thereof extends toward an outer circumferential surface of the rotor 5 to contact the outer circumferential surface of the rotor 5, such that both sides in a shaft direction of the rotor 5 based on the brush 110 are sealed with the brush 110.

A right pressure PH of the brush 110 is relatively higher than a left pressure (PL) thereof and the brush 110 seals a fluid flowing from a high pressure region to a low pressure region.

One surface 111 of the brush 110 in the low pressure region adheres to the support strip 120 and one end of the support strip 120 is fixed by being inserted into the mounting groove 13 together with brush 110. The support strip 120 serves to prevent a deformation of the brush 110 due to a pressure difference between both sides of the brush 110.

The support strip 120 may have a ring shape of a thin plate and preferably has elasticity. The support strip 120 may also be made of a synthetic material relatively strong against heat, preferably, a metal material having elasticity. In this case, the support strip 120 is welded to an intermediate part of the mounting groove 13 by a welding part 150, together with the brush 110.

The other end of the support strip 120 extending toward the rotor 5 is positioned inside the other end of the brush 110. This is to prevent the rubbing of the support strip 120 with the rotor 5 and an end of the support strip 120 is positioned to be more spaced apart from the outer circumferential surface of the rotor 5 outward in a radial direction than the end of the brush 110.

The support strip 120 has a plate shape having elasticity, and as a result, may be elastically deformed when it contacts the rotor 5. Therefore, it may reduce heat generation and abrasion due to the rubbing than the plates 46 and 48 (see FIG. 2) supporting both sides of the brush 110 and may increase sealing efficiency by reducing the gap from the rotor 5 than the existing plate.

A pair of back plates 130 and 140 which is positioned at both sides of the brush 110 and the support strip 120 one by one is interposed in the mounting groove 13 and the first back plate 130 press-fitted in one side of the mounting groove 13 supports one side of the support strip 120. Further, the second back plate 140 press-fitted in the other side of the mounting groove 13 supports one surface 112 of a high pressure region corresponding to the other side of the brush 110.

The first back plate 130 and the second back plate 140 serve to support the brush 110 and the support strip 120 against a flow of fluid and a support strip opposing surface 131 of the first back plate 130 disposed in a low pressure region adheres to one surface of the support strip 120. A lower end of a brush opposing surface 141 of the second back plate 140 which is disposed in the high pressure region is provided with a step part 142 and thus a predetermined clearance 143 is formed between the brush 110 and the second back plate 140.

An opposing end (lower end in the drawing) of the rotor 5 of the back plates 130 and 140 is positioned inside an opposing end (lower end in the drawing) of the rotor 5 of the support strip 120, and as a result the rubbing the back plates 130 and 140 with the rotor 5 and the ends of the back plates 130 and 140 are positioned to be spaced apart from the outer circumferential surface of the rotor 5 outward in a radial direction than the end of the support strip 120.

The brush 110 is firmly supported by the back plates 130 and 140 and the support strip 120, while the support strip 120 is elastically deformed at the time of the occurrence of the rubbing of the support strip 120 with the rotor 5, thereby more reducing the heat generation and the abrasion than before.

Figure 4:
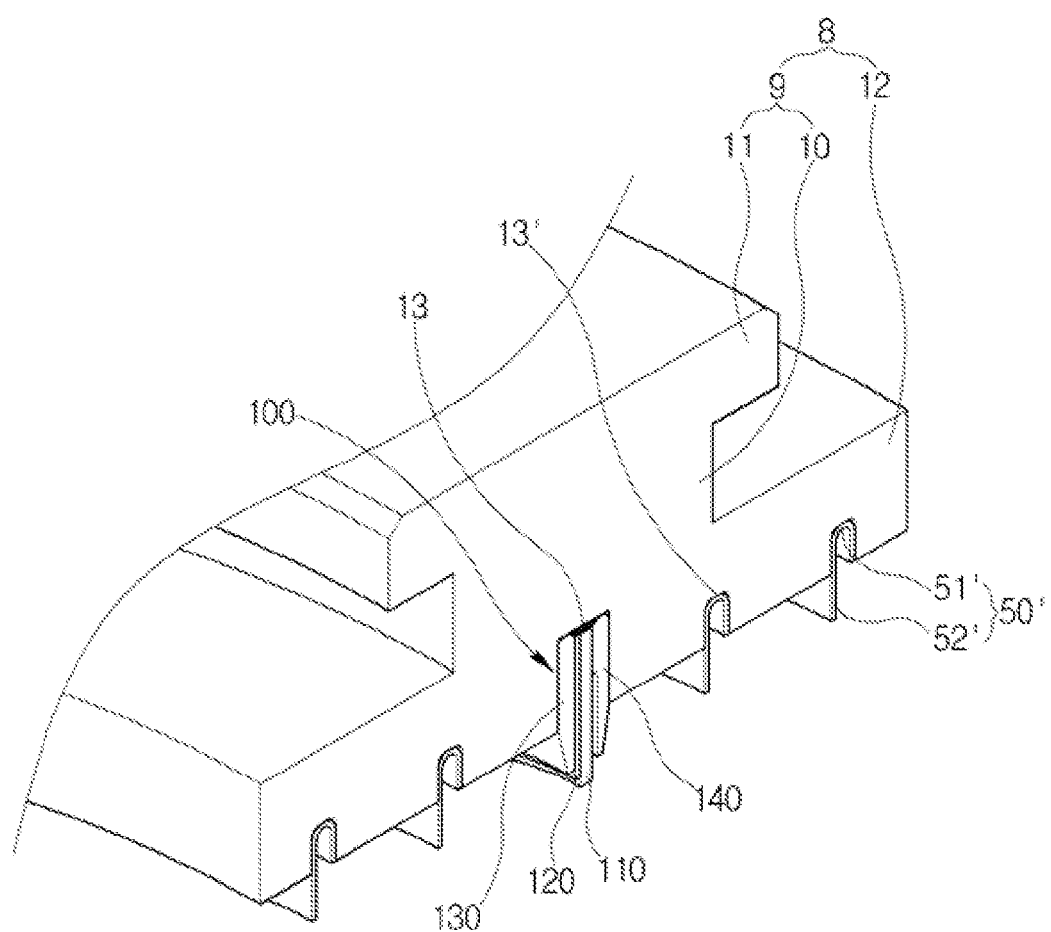
FIG. 4 is a use state diagram of the brush seal assembly according to the first exemplary embodiment.

FIG. 4 is a use state diagram of the brush seal assembly according to the first exemplary embodiment.

Referring to FIG. 4, a center of a bottom surface of the sealing body 8 is provided with the brush seal assembly 100 according to the first exemplary embodiment, while a plurality of seal strips 50' may be provided to be spaced apart from each other in a width direction of the sealing body 8.

One end of the seal strip 50' is inserted into a seal strip mounting groove 13' and the other end thereof extends toward the rotor 5 (see FIG. 1) and generally has a 'J'-letter shape and the seal strip 50' includes a bending part 51' which is inserted into the seal strip mounting groove 13' to be bent along a wall surface of the seal strip mounting groove 13' and an extension 52' which extends from one end of the bending part 51' toward the rotor 5.

Figure 5:
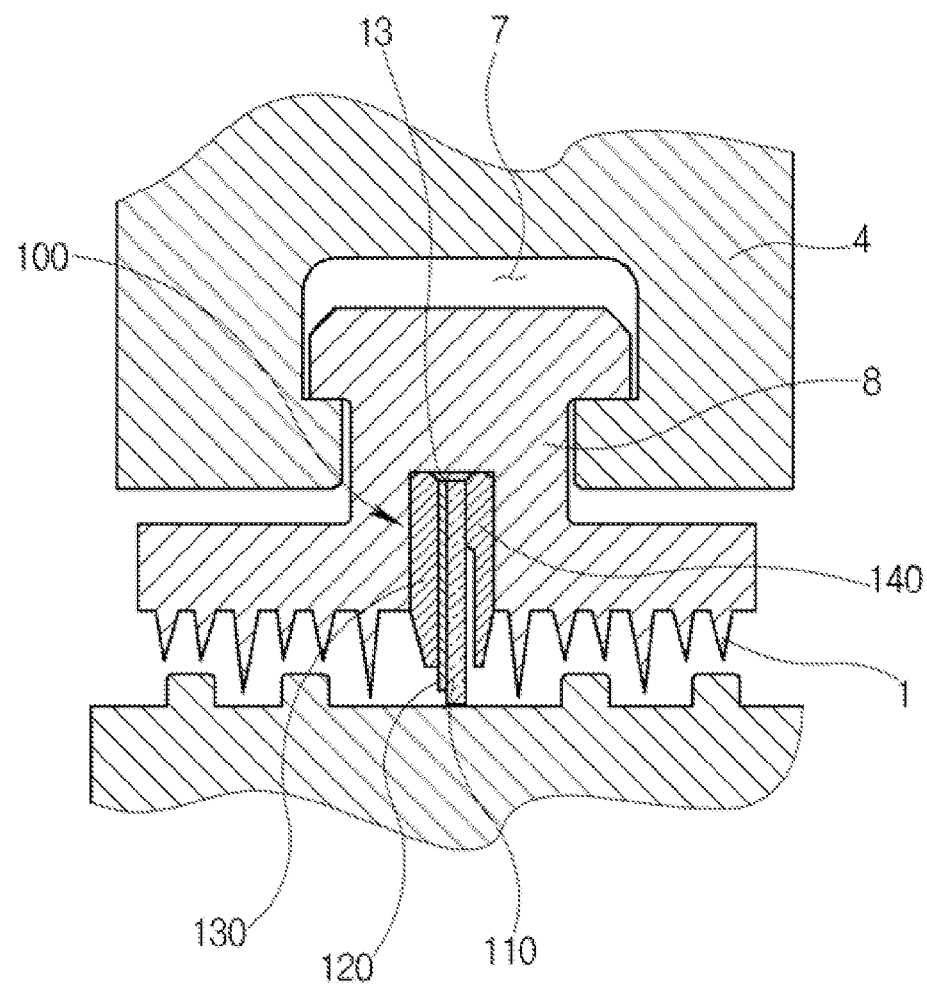
FIG. 5 is another use state diagram of the brush seal assembly according to the first exemplary embodiment.

The brush seal assembly 100 according to the first exemplary embodiment and the existing labyrinth seal 1 may be applied together and FIG. 5 is a use state diagram illustrating another example in which the brush seal assembly 100 according to the first exemplary embodiment and the existing labyrinth seal 1 are applied together.

Further, the brush seal assembly according to the exemplary embodiment to be described below may also be used with the plurality of seal strips 50' provided to be spaced apart from each other along the width direction of the sealing body 8, as illustrated in FIG. 4 or may be used with the existing labyrinth seal 1 as illustrated in FIG. 5.

Figure 6:
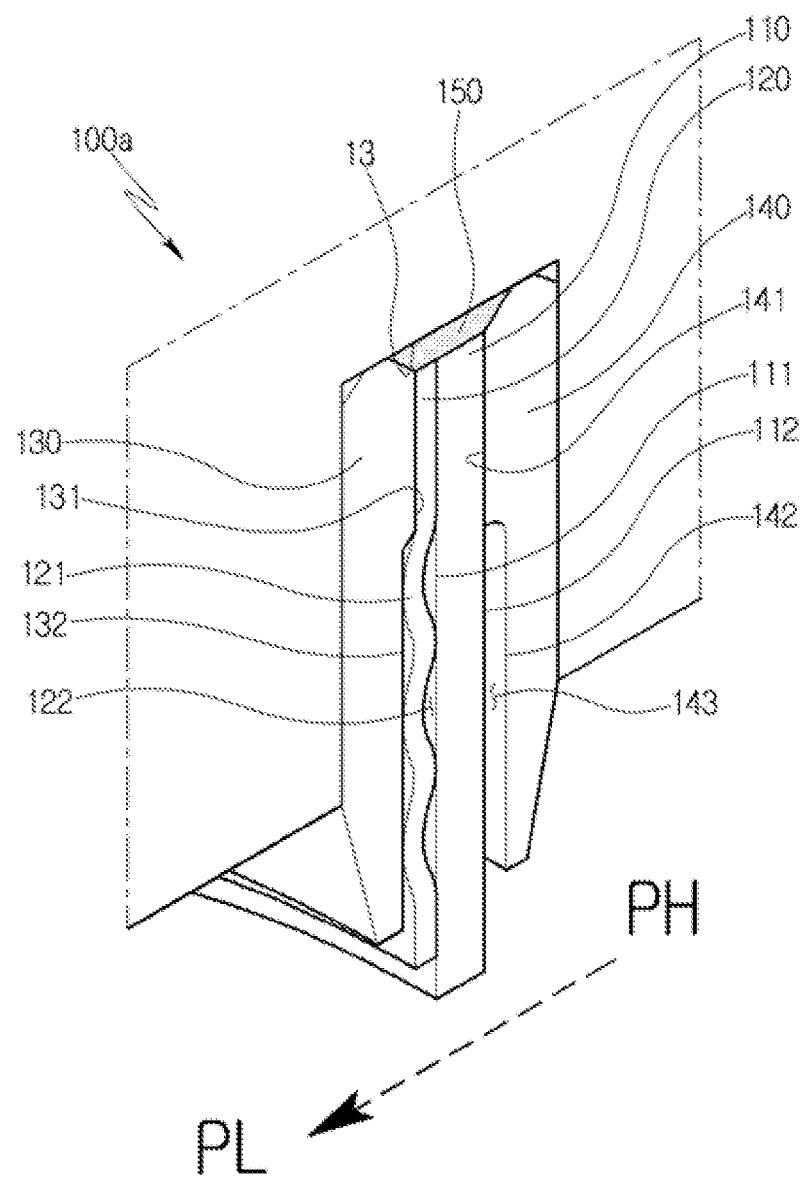
FIG. 6 is a schematic diagram a brush seal assembly according to a second exemplary embodiment.

FIG. 6 is a schematic diagram a brush seal assembly according to a second exemplary embodiment.

Referring to FIG. 6, basic components of a brush seal assembly 100a according to a second exemplary embodiment are similar to those of the brush seal assembly 100 according to the first exemplary embodiment as described above, but the brush seal assembly 100a according to the second exemplary embodiment is different from the brush seal assembly 100 according to the first exemplary embodiment in that at least one flexed part 121 is formed in the support strip 120.

Therefore, the same components having the same functions as the first embodiment as described above are denoted by the same reference numerals and the overlapping description thereof will be omitted.

The support strip 120 is provided with at least one flexed part 121 and the support strip opposing surface 131 of the first back plate 130 supporting one side of the support strip 120 is provided with a step part 132 for receiving the flexed part 121.

An example in which the flexed part 121 has an arch-shaped cross section is illustrated but is not limited thereto and therefore the flexed part may also have a polygonal cross section form like a triangle or a quadrangle.

The flexed parts 121 may be formed to be spaced from each other and may be continuously formed in a wave form. That is, standards like the number and a protruding height of flexed parts 121, an interval between the flexed parts 121, and the like may be appropriately selected if necessary.

Meanwhile, a pressure pocket 122 which is a space into which a fluid in the high pressure region is introduced is formed between the flexed parts 121 and the brush 110, respectively, the pressure of the high-pressure fluid introduced into the pressure pocket 122 serves to support the one surface 111 of the low pressure region of the brush 110, and the fluid in the high pressure region is introduced into the pressure pocket 122 through a clearance between the bristles forming the brush 110.

Further, the flexed part 121 may enhance stiffness of the support strip 120.

Figure 7:
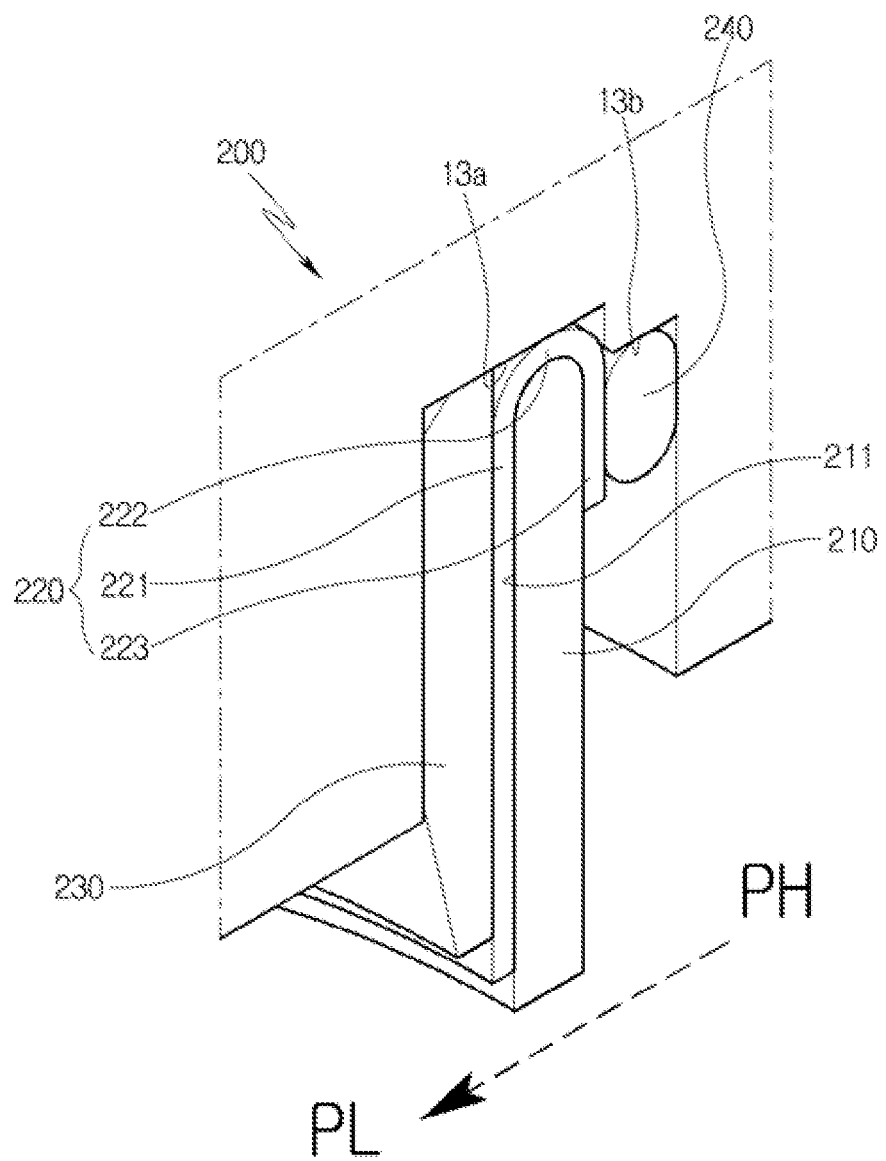
FIG. 7 is a schematic diagram a brush seal assembly according to a third exemplary embodiment.

FIG. 7 is a schematic diagram a brush seal assembly according to a third exemplary embodiment.

Referring to FIG. 7, a brush seal assembly 200 according to a third exemplary embodiment includes a brush 210, a support strip 220 supporting one side of the brush 210, a back plate 230 supporting one side of the support strip 220, and an anchoring member 240 supporting the other side of the brush 210.

The brush 210 includes a plurality of bristles, in which standards like the number, the thickness, and the like of the bristle forming the brush 210 may be appropriately selected if necessary.

One end of the brush 210 is inserted into the brush insertion groove 13a, and the other end thereof extends toward the outer circumferential surface of the rotor 5 (see FIG. 1) and thus the end thereof contacts the outer circumferential surface of the rotor 5. As a result, both sides in a shaft direction of the rotor 5 based on the brush 210 is sealed with the brush 210.

In the drawings, the right pressure PH of the brush 210 is relatively higher than the left pressure (PL) thereof and the brush 210 seals a fluid flowing from the high pressure region to the low pressure region.

In this case, the support strip 220 is provided to adhere to one surface of the brush 210, that is, one surface 211 of the low pressure region and the support strip 220 serves to prevent the deformation of the brush 210 due to the pressure difference between both sides of the brush 210.

The support strip 220 has a ring shape of a thin plate having a "J"-letter cross section and may be made of a material which is relatively strong against heat but has elasticity as well as metal. Further, as the support strip 220 according to the exemplary embodiment, the seal strip 50' (see FIG. 5) described with reference to FIG. 4 may be used.

The support strip 220 includes a support part 221 supporting one side of the brush 210 and a bending part 222 which is bent from one end of the support part 221 to be rounded in an arch shape to enclose one end of the brush 210.

Further, to prevent the support strip 220 from being separated, an extension 223 preferably extends from one end of the bending part 222 as much as a predetermined length. That is, one end of the support strip 220 is bent to enclose one end of the brush 210 and the extension 223 of the support strip 220 partially covers the other side of the brush 210.

The other end of the support strip 220 is positioned inside the other end of the brush 210. This may prevent the rubbing of the support strip 220 with the rotor 5, and as a result, an end of the support strip 220 is positioned at a point which is more spaced apart from the outer circumferential surface of the rotor than the end of the brush 210. This may reduce the heat generation and the abrasion due to the rubbing with the rotor 5 and the gap from the rotor 5 is reduced, which may increase the sealing efficiency.

The brush 210 and the support strip 220 are inserted into a brush insertion groove 13a formed at a center of a bottom surface of a body part 12 (see FIG. 1) of the sealing body 8 (see FIG. 1) in the state in which one end of the brush 210 is enclosed with the bending part 222 of the support strip 220.

Further, to support one side of the support strip 220, the back plate 230 is inserted into the brush insertion groove 13a. In this case, to prevent the rubbing 5 of the back plate 230 with the rotor 5, the opposing end of the rotor 5 of the back plate 230 is preferably positioned inside the opposing end of the rotor 5 of the support strip 220. That is, an end of the back plate 230 is positioned to be more spaced apart from the outer circumferential surface of the rotor 5 outward in the radial direction than the end of the support strip 220.

To prevent the brush, 210, the support strip 220, and the back plate 230 from being separated, an anchoring member 240 is press-fitted in an anchoring member insertion groove 13*b* of one side of the brush insertion groove 13*a*.

The anchoring member 240 presses the extension 223 of the support strip 220 toward the brush 210, and thus the brush 210 and the support strip 220 are pressed toward the back plate 230, such that the brush 210, the support strip 220, and the back plate 230 are firmly fixed into the brush insertion groove 13*a*.

For example, the anchoring member 240 may be made of elastomer having a ring shape and extends outward and therefore may have a wire shape in which a plurality of strands are twisted in a length direction.

Further, the anchoring member insertion groove 13*b* is preferably stepped from one side of the brush insertion groove 13*a* toward the rotor 5 so that the anchoring member 240 may press the extension 223 of the support strip 220.

A bottom surface of the anchoring member insertion groove 13*b* protrudes from one side of the bottom surface of the brush insertion groove 13*a* toward the rotor 5.

Preferably, the bottom surface of the anchoring member insertion groove 13*b* is formed to correspond to a boundary between the bending part 222 and the extension 223 of the support strip 220, and thus the anchoring member 240 press-fitted in the anchoring member insertion groove 13*b* intensively presses the extension 223 of the support strip 220 as illustrated in FIG. 7, thereby firmly fixing the brush 210, the support strip 220, and the back plate 230 into the brush insertion groove 13*a*.

The support part 221 of the support strip 220 supports one surface 211 in the low pressure region of the brush 210, while the support part 221 of the support strip 220 is supported by the back plate 230 and therefore it is possible to reduce the deformation of the brush 210 due to the pressure difference between both sides of the brush 210 and the fluid leakage due to the deformation.

In the brush seal assembly 200, the brush 210, the support strip 220, and the back plate 230 are inserted into the brush insertion groove 13*a* of the sealing body 8 and the anchoring member 240 is fitted in the anchoring member insertion groove 13*b* to allow the anchoring member 240 to press and support the brush 210, the support strip 220, and the back plate 230, thereby completing the installation of the brush seal assembly 200. Therefore, the brush seal assembly structure may be easily assembled, and thereby may save manufacturing and assembling costs.

Figure 8:
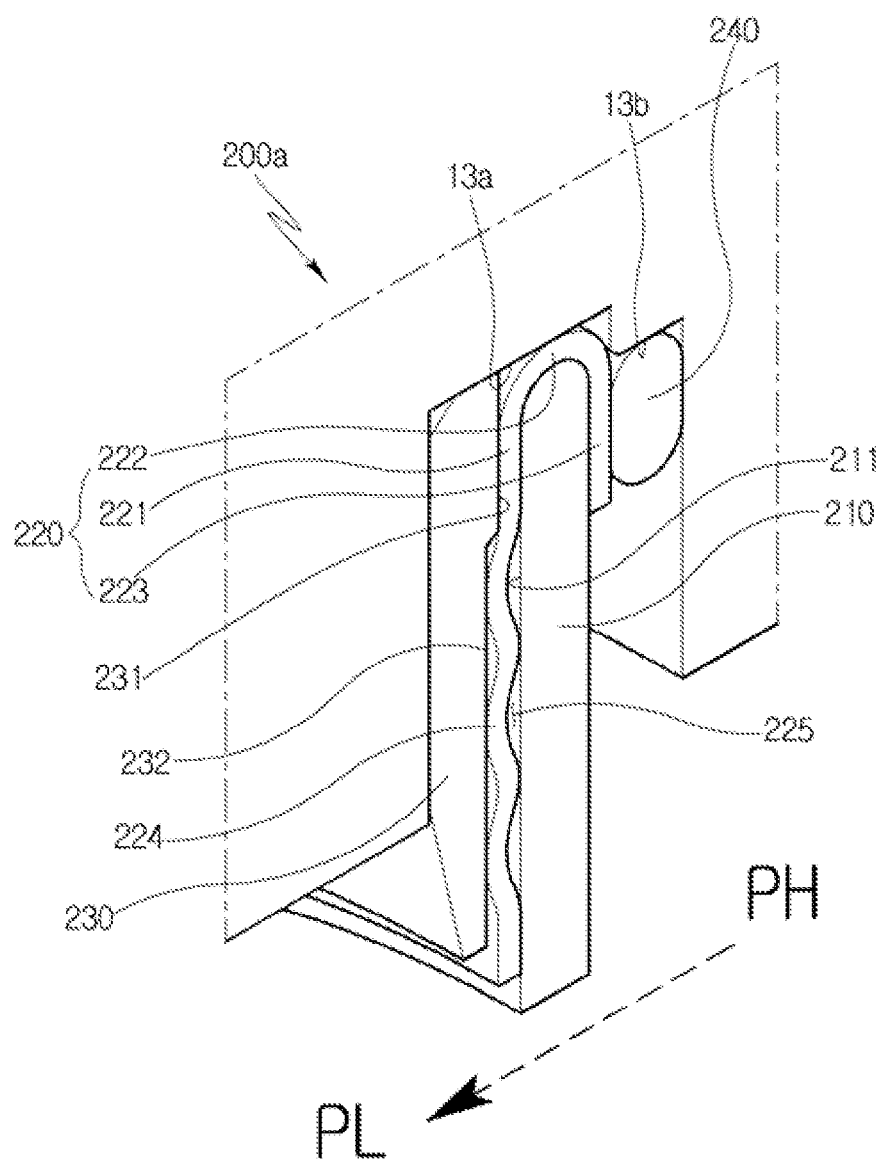
FIG. 8 is a schematic diagram a brush seal assembly according to a fourth exemplary embodiment.

FIG. 8 is a schematic diagram a brush seal assembly according to a fourth exemplary embodiment.

Basic components of a brush seal assembly 200*a* according to a fourth exemplary embodiment are similar to those of the brush seal assembly 200 according to the third exemplary embodiment as described above with reference to FIG. 7, but the brush seal assembly 200 according to the third exemplary embodiment is different from the brush seal assembly 200*a* according to the first exemplary embodiment in that at least one flexed part 224 is formed in the support strip 220.

Therefore, the same components having the same functions as the third embodiment as described above are denoted by the same reference numerals and the overlapping description thereof will be omitted.

According to the fourth exemplary embodiment, at least one flexed part 224 is formed at the support part 221 of the support strip 220. In this case, a support strip opposing surface 231 of the back plate 230 supporting one side of the support strip 220 is provided with a stepped part 232 for receiving the flexed part 224.

An example in which the flexed part 224 has an arch-shaped cross section is illustrated but is not limited thereto and therefore the flexed part may also have a polygonal cross section form like a triangle or a quadrangle.

Further, the plurality of flexed parts 224 according to the fourth exemplary embodiment may be formed to be spaced apart from each other and may also be continuously formed in a wave form. That is, standards like the number and the protruding height of flexed parts 224, the interval between the flexed parts 224, and the like may be appropriately selected if necessary.

In this case, the flexed part 221 formed at the support part 221 may enhance the stiffness of the support strip 220.

A pressure pocket 225 introduced into which the fluid in the high pressure region is introduced is formed between each of the flexed parts 224 and the brush 210.

The pressure pocket 225 forms a high pressure using the fluid in the high pressure region introduced through a clearance between the bristles forming the brush 210 to serve to support one surface 211 of the low pressure region of the brush 210.

That is, according to the brush seal assembly 200*a* according to the fourth exemplary embodiment, the pressure pocket 225 supporting the one surface 221 of the low pressure region of the brush 210 may reduce the deformation of the brush 210 and the fluid leakage due to the deformation.

The support strip according to a first exemplary embodiment will be described with reference to the accompanying drawings.

Figure 9:
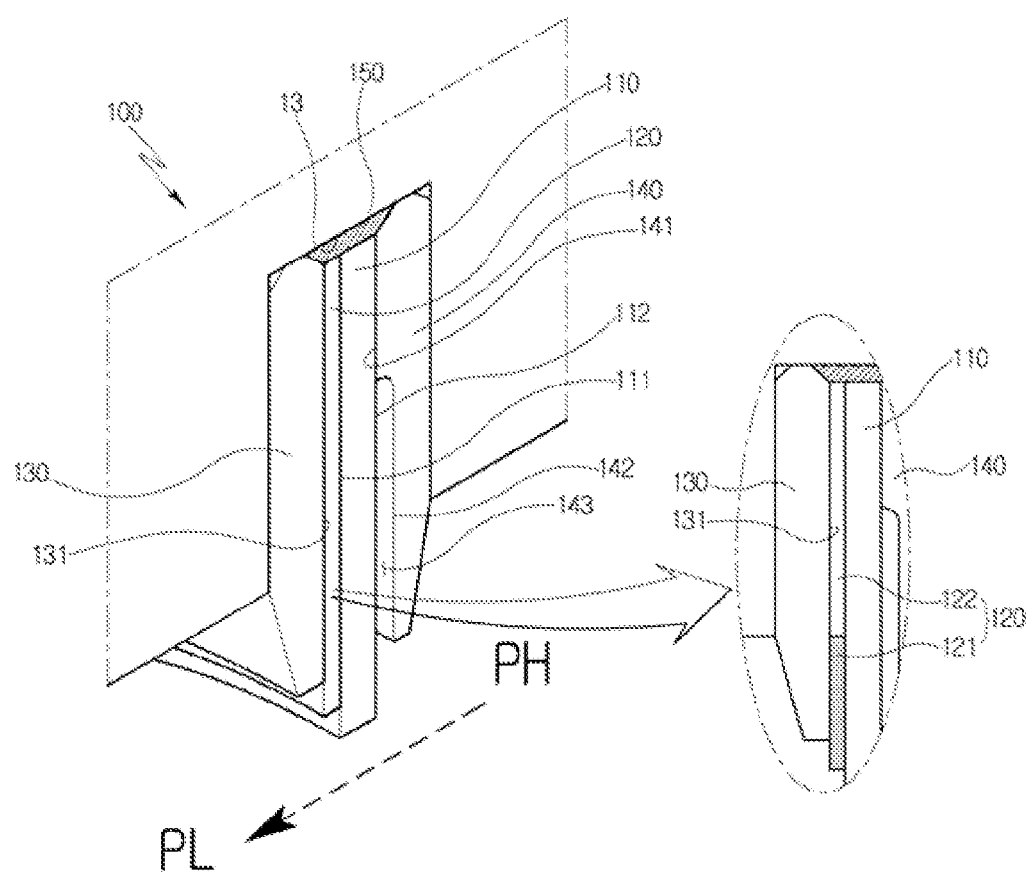
FIGS. 9 to 11 are diagrams illustrating a support strip according to a first exemplary embodiment.

Referring to FIG. 9, for the elastic deformation of the support strip 120 in response to a load applied through the rotor 5, the first support strip 121 extending from the lower end thereof to a predetermined section of the upper portion thereof is made of a material having an elastic recovering force and the second support strip extending from the first support strip 121 to an upper end thereof is made of material different from the first support strip 121.

The first support strip 121 extends upward from the lower end as much as a predetermined length as illustrated in an enlarged view and is not necessarily limited to the length illustrated in the enlarged view and therefore it is to be noted that the length of the first support strip may be changed.

The second support strip 122 is made of a material different from the first support strip 121, and for example, is made of steel or a material having an elastic restoring force. In this case, the second support strip 122 may have the elastic restoring force different from that of the first support strip 121 to prevent the support force for the brush 110 from reducing and may more easily elastically deform the lower portion thereof contacting the rotor 5 to reduce the heat generation and the abrasion due to the rubbing.

Figure 10:
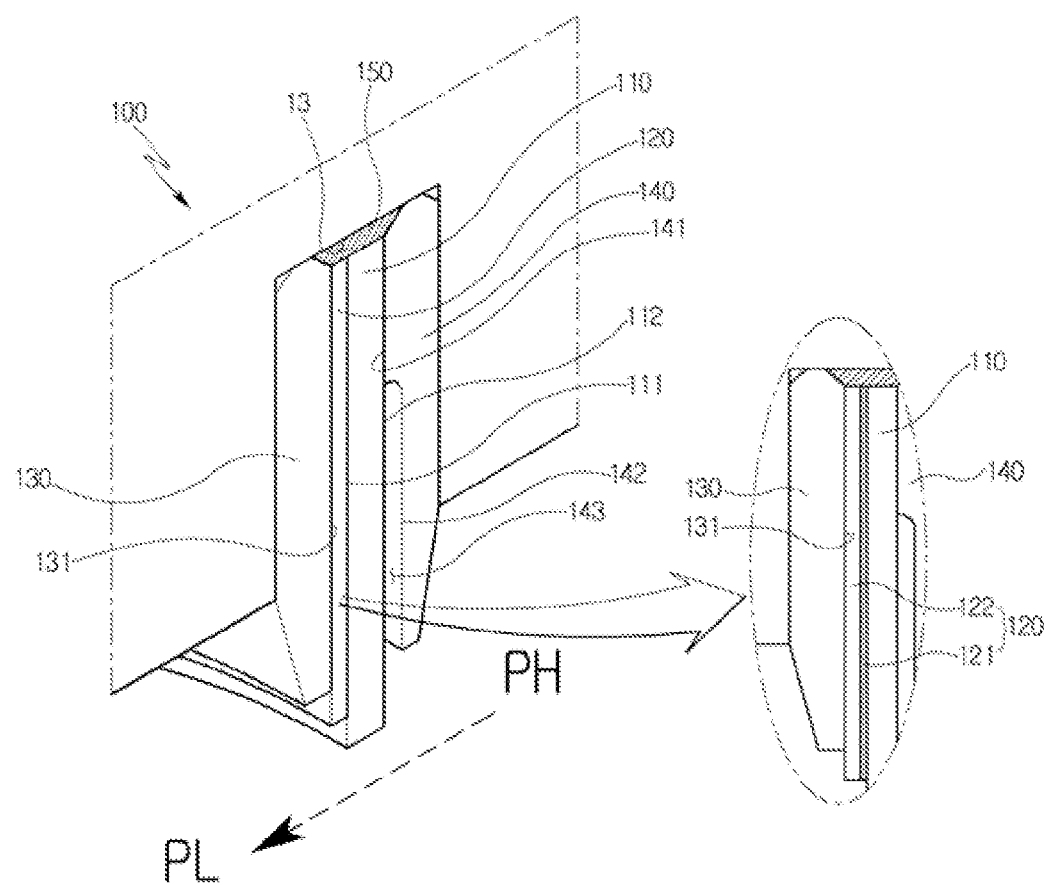

Referring to FIG. 10, in the support strip 120, the first support strip 121 facing the brush based on a vertical direction is classified by the material having the elastic restoring force and the second support strip 122 facing the back plate 130 is made of a material different from the first support strip 121.

Unlike the foregoing exemplary embodiment, according to the present exemplary embodiment, the first and second support strips 121 and 112 are each divided in a horizontal direction, in which the first support strip 121 has a thickness thinner than that of the second support strip 122 as illustrated in the enlarged view.

In this case, the rotor 5 contacts the support strip 120 and thus when the load is applied in a vertical direction, the support force 110 in the length direction of the brush 110 is enhanced.

Further, when the fluid moves from the PH to the PL, the first support strip 121 adhering to the brush 110 may be more easily elastically deformed in the length direction to reduce the stress concentration applied to the brush 110.

Figure 11:
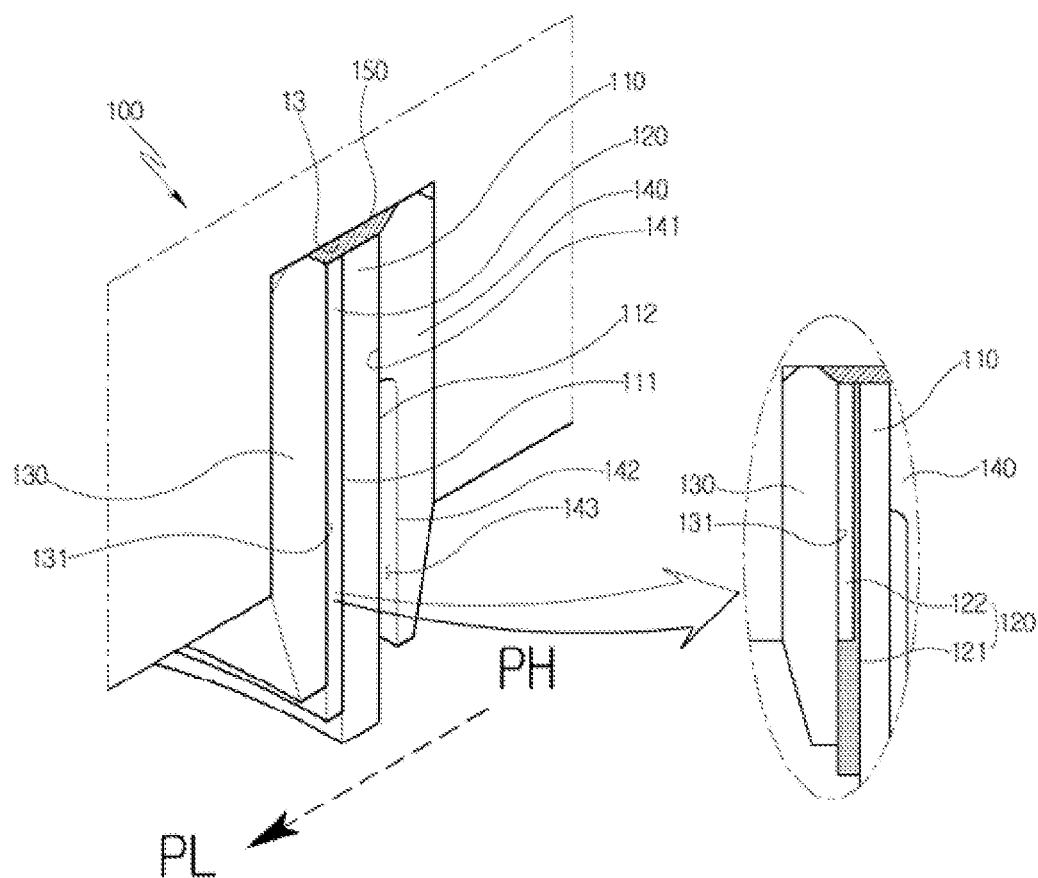

Referring to FIG. 11, in the support strip 120, the first support strip 121 extending from the lower end to the predetermined section of the upper and facing the brush is classified by the material having the elastic restoring force and the rest second support strip 122 is made of a material different from the first support strip 121.

In this case, when the support strip 120 adhering to the brush 110 is irregularly elastically deformed in the vertical direction or the horizontal direction (transversal direction), the improvement in the support force for the brush 110 and the occurrence in deformation thereof may be reduced, and may thereby improve durability even at the time of the long-term use.

A support strip according to a second exemplary embodiment will be described with reference to the drawings.

Figure 12:
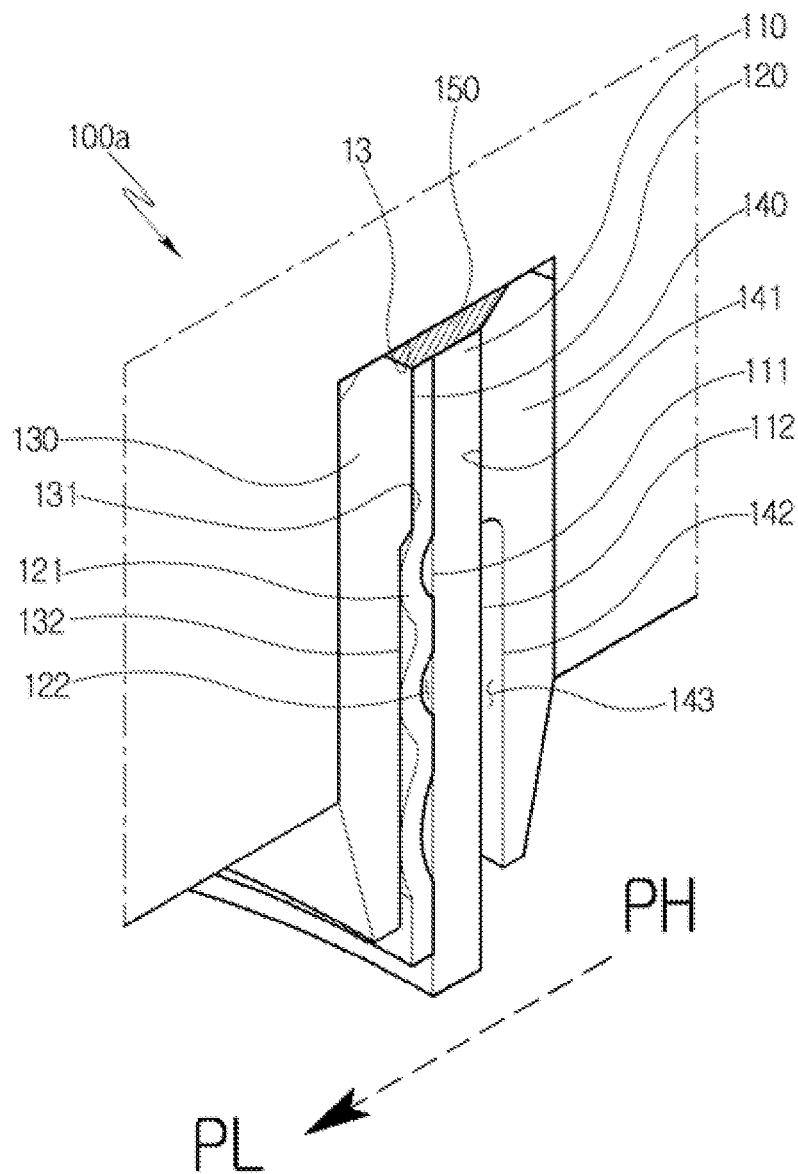
FIGS. 12 and 13 are diagrams illustrating a support strip according to a second exemplary embodiment.

Referring to FIG. 12, in the support strip 120, the pressure pocket 122 formed on the opposing surface of the brush 110 is formed along the length direction of the support strip 120 to have different radii. For example, the pressure pocket formed at the lower end based on the length direction of the support strip 120 and the pressure pockets formed at the center and the upper side are formed to have different radii.

For example, when the radius of the pressure pocket formed at the lower end is formed to be relatively larger, the fluid quantity introduced into the pressure pocket having the increased radius is increased and thus the occurrence of vibrations due to the change in pressure directly delivered toward the lower end of the brush 110 may be reduced.

Figure 13:
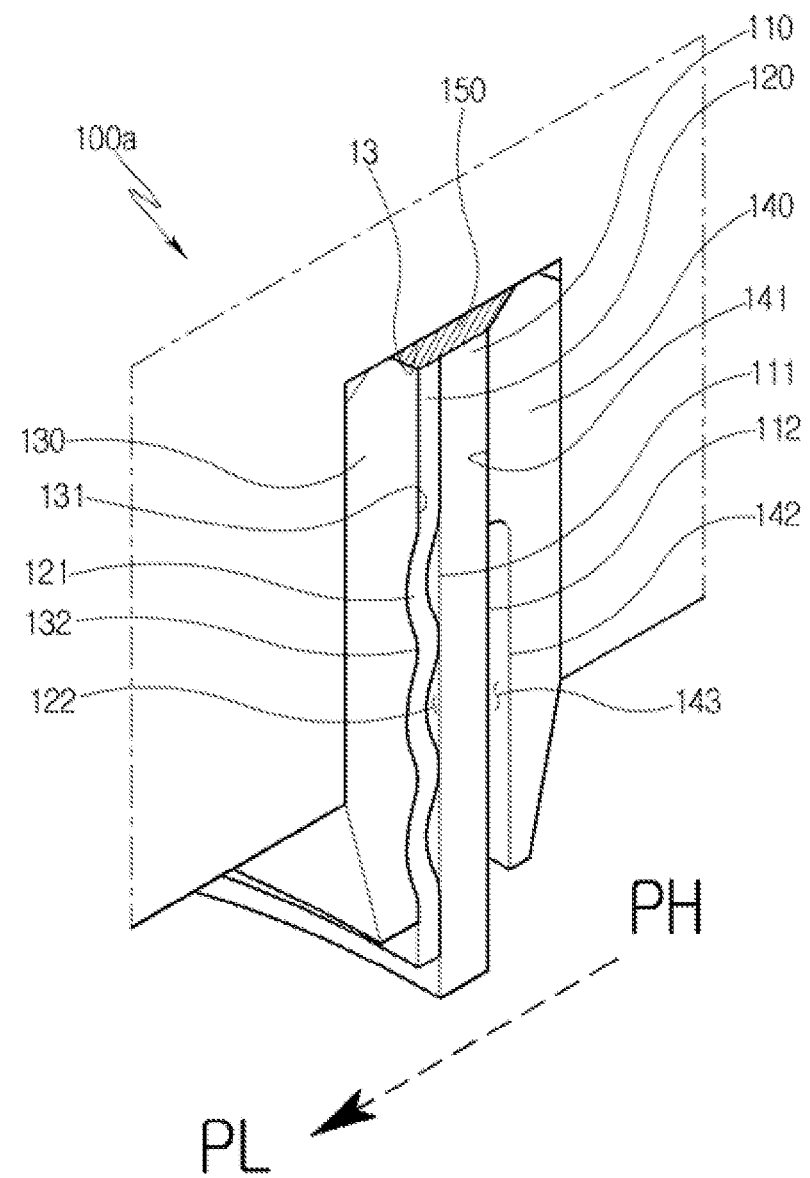

Referring to FIG. 13, the back plate 130 is formed so that the opposing surface to the support strip 120 keeps on adhering to the rounded outer circumferential surface of the pressure pocket 122.

In this case, the state in which the back plate 130 adheres to the support strip 120 may be more stably maintained and thus when the high pressure fluid moves to the back plate 130 through the brush 110 this configuration may more stably support the back plate and may reduce the occurrence of vibrations due to the change in pressure.

Figure 14:
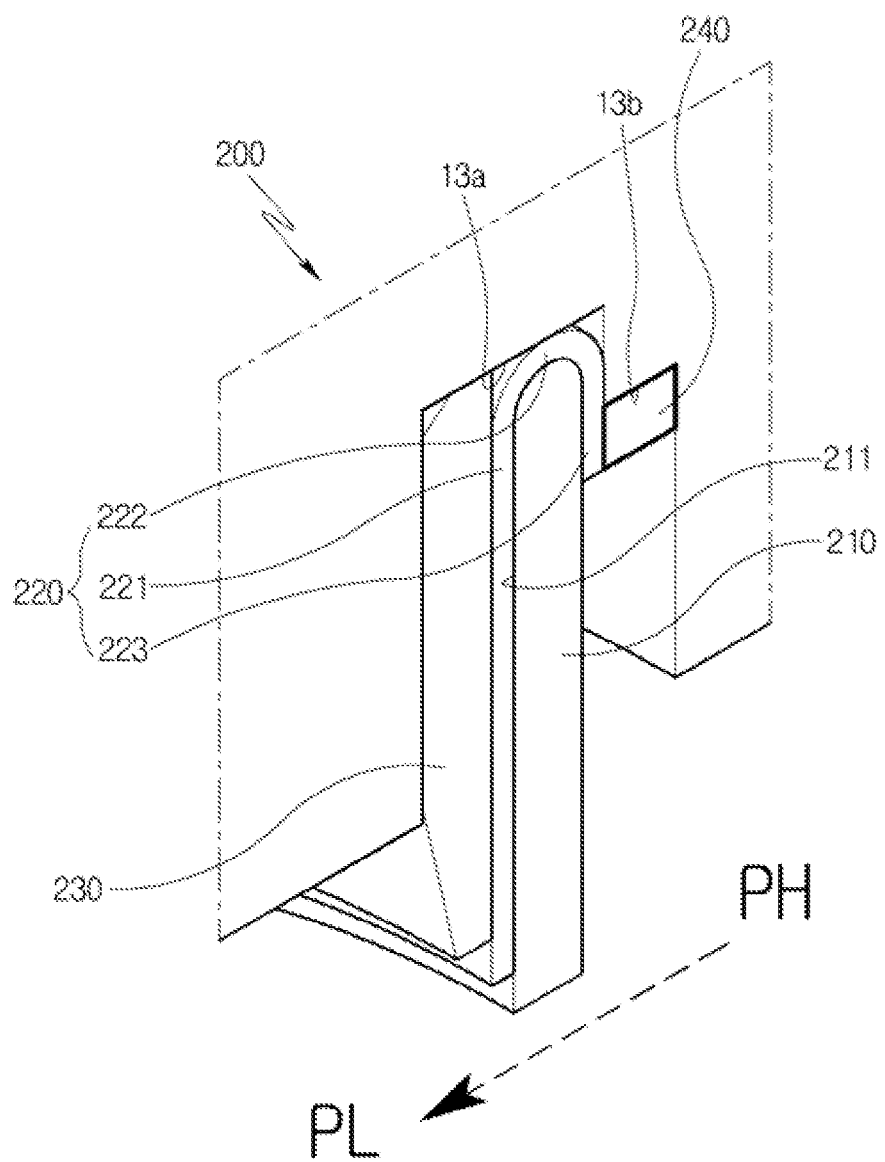
FIG. 14 is a diagram illustrating an anchoring member according to a third exemplary embodiment.

Referring to FIG. 14, the anchoring member 240 has substantially a rectangular shape and thus one surface of the anchoring member 240 adheres to the outer circumferential surface of the extension 223 extending from the support strip 220 and the other surface thereof is fitted-in the anchoring member insertion groove 13b in a complete adhering state.

The anchoring member 240 has a shape corresponding to the shape of the anchoring member insertion groove 13b, and therefore even after the anchoring member 240 is inserted, an empty space does not occur and the fixing of the support strip 220 is stably maintained, thereby constantly maintaining the fixed state of the brush 210 over the whole section.

As a result, the malfunction of the brush 110 due to the rubbing shape may be prevented and thus the brush 110 may be maintained in a more sealed state.

A brush seal assembly according to a fifth exemplary embodiment will be described with reference to the accompanying drawings.

Figure 15:
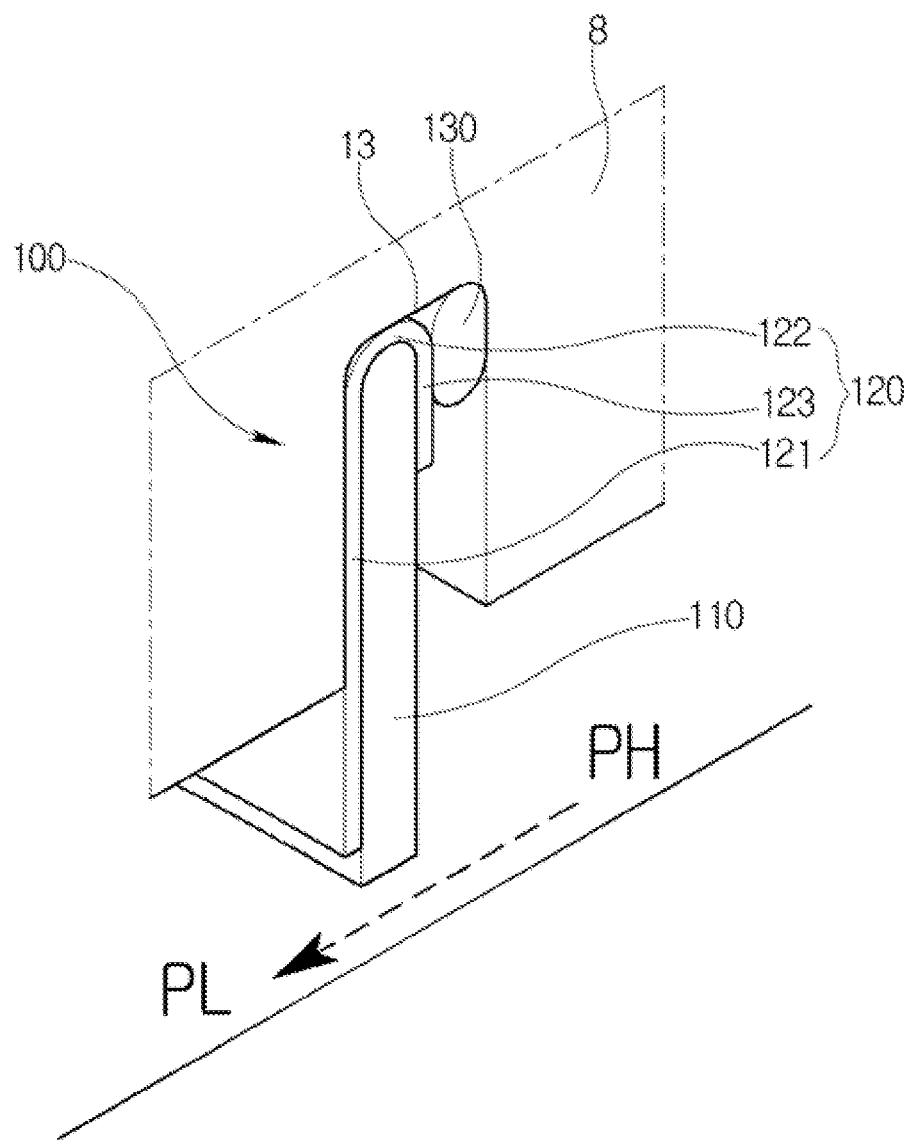
FIG. 15 is a schematic diagram of a brush seal assembly according to a fifth exemplary embodiment.

Referring to FIG. 15, the brush seal assembly 110 includes the brush 110, the support strip 120 supporting one side of the brush 110, and the anchoring member 130 supporting the other side of the brush 110.

The brush 110 includes the plurality of bristles, in which standards like a thickness, and the like of the bristle may be appropriately selected if necessary.

One end of the brush 110 is inserted into the mounting groove 13, and the other end thereof extends toward the outer circumferential surface of the rotor 5 (see FIG. 1) and thus the end thereof contacts the outer circumferential surface of the rotor 5. Therefore, both sides of the shaft direction of the rotor 5 based on the brush 110 are sealed with the brush 110.

The right pressure of the brush 110 is relatively higher than the left pressure thereof and the brush 110 reduce the leakage of the fluid in the high pressure region to the low pressure region.

The support strip 120 is provided to adhere to one surface of the brush 110, that is, one surface of the low pressure region and the support strip 120 serves to prevent the deformation of the brush 110 due to the pressure difference between both sides of the brush 210.

The support strip 120 has the ring shape of the thin plate having the "J"-letter cross section and may be made of a material which is relatively strong against heat but has elasticity as well as metal.

The support strip 120 includes the support part 121 supporting one side of the brush 110 and the bending part 121 which is bent from one end of the support part 122 to be rounded in the arch shape to enclose one end of the brush 110.

To prevent the support strip 120 from being separated, the extension 122 preferably extends from one end of the bending part 123 as much as a predetermined length. That is, one end of the support strip 120 is bent to enclose one end of the brush 110 and the extension 123 of the support strip 120 partially covers the other side of the brush 110.

The other end of the support strip 120 is positioned inside the other end of the brush 110. This is to prevent the rubbing of the support strip 120 with the rotor 5 and the end of the support strip 120 is positioned at a point which is more spaced apart from the outer circumferential surface of the rotor 5 than the end of the brush 110.

The support strip 120 according to the exemplary embodiment has the thin plate shape and elasticity, and therefore may be elastically deformed when it contacts the rotor 5 to reduce the heat generation and the abrasion due to the rubbing than the existing plate and may reduce the gap from the rotor 5 than the existing plate to increase the sealing efficiency.

One end of the brush 110 and one end of the support strip 120 are inserted into one side of the mounting groove 13 and the anchoring member 130 is press-fitted in the other side of the mounting groove 13 to prevent the brush 110 and the support strip 120 from being separated.

The anchoring member 130 presses the extension 123 of the support strip 120 toward the brush 110 and thus the brush 110 and the support strip 120 serves to be fixed and supported to the mounting groove 13. For example, the anchoring member 130 may be formed of the ring-shaped elastomer and extends long outward and therefore has a wire shape in the length direction.

The support part 121 of the support strip 120 is interposed between the brush 110 and a wall surface of one side of the mounting groove 13 and the anchoring member 130 is interposed between the extension 123 of the support strip 120 and a wall surface of the other side of the mounting groove 13.

The support part 121 of the support strip 120 supports one side of the low pressure region of the brush 110, while the support part 121 of the support strip 120 is supported to the wall surface of one side of the mounting groove 13, thereby preventing the deformation of the brush due to the pressure difference between both sides of the brush 110 and the fluid leakage due to the deformation.

The brush 110 and the support strip 120 are inserted into one side of the mounting groove 13 of the sealing body 8 and the anchoring member 130 is press-fitted in the other side of the mounting groove 13, thereby completing the installation of the brush seal assembly 100. Therefore, the brush seal assembly may be easily assembled, and thereby may save manufacturing and assembling costs.

Figure 16:
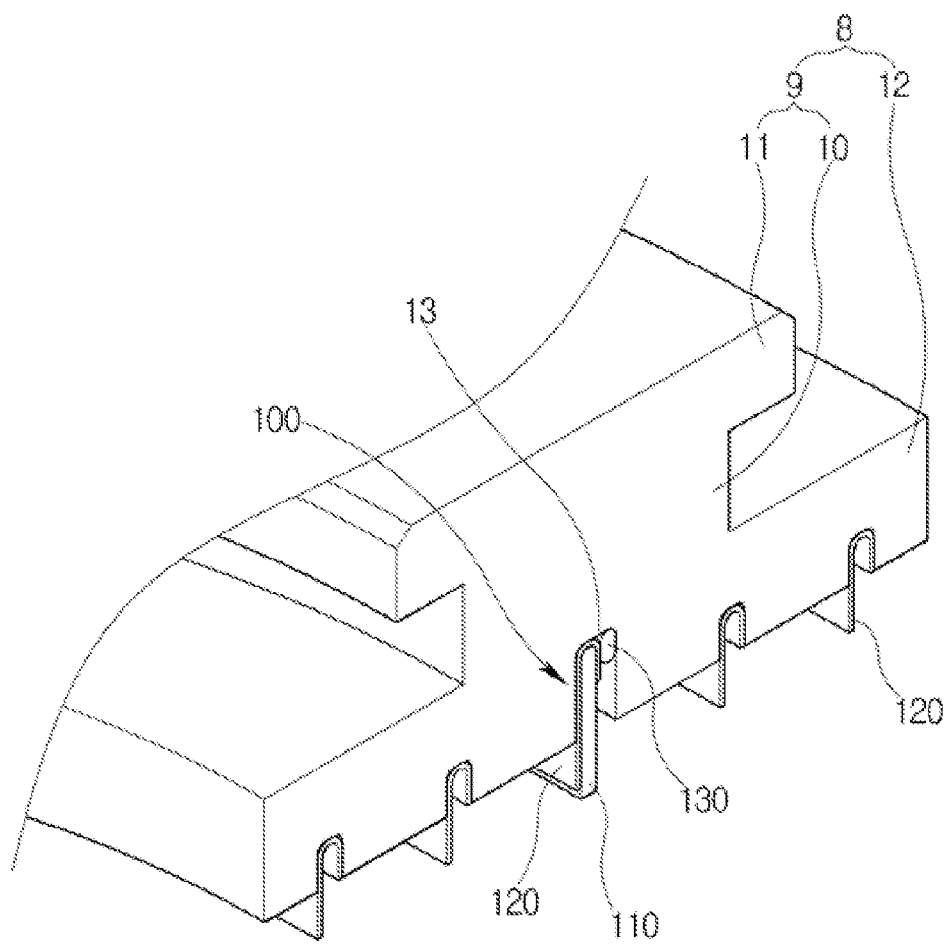
FIG. 16 is a use state diagram of the brush seal assembly according to the fifth exemplary embodiment.

Referring to FIG. 16, the center of the bottom surface of the sealing body 8 is provided with the brush seal assembly 100, while a plurality of seal strips 120' may be provided to be spaced apart from each other in the width direction of the sealing body 8.

Figure 17:
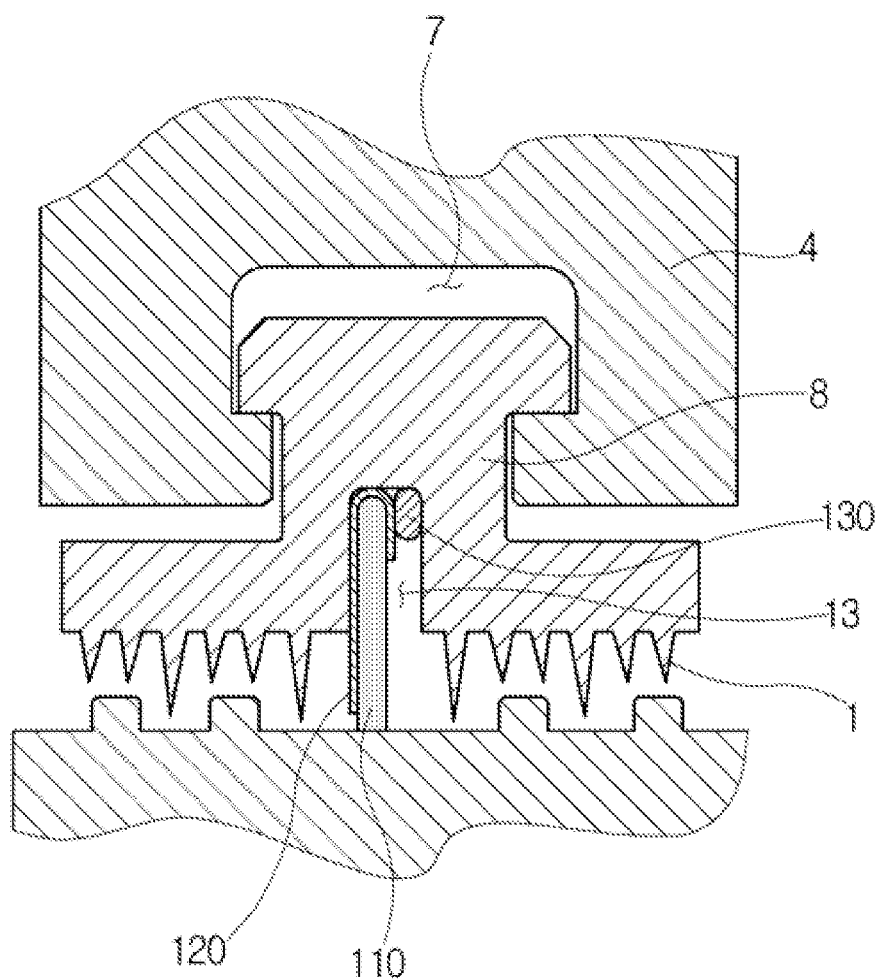
FIG. 17 is another use state diagram of the brush seal assembly according to the fifth exemplary embodiment.

Referring to FIG. 17, the brush seal assembly 100 according to the exemplary embodiment and the existing labyrinth seal may also be applied together and a brush seal assembly according to the exemplary embodiment to be described below may be used with the plurality of support strips 120 provided to be spaced apart from each other along the width direction of the sealing body 9 as illustrated in FIG. 16.

A brush seal assembly according to a sixth exemplary embodiment will be described with reference to the accompanying drawings.

Figure 18:
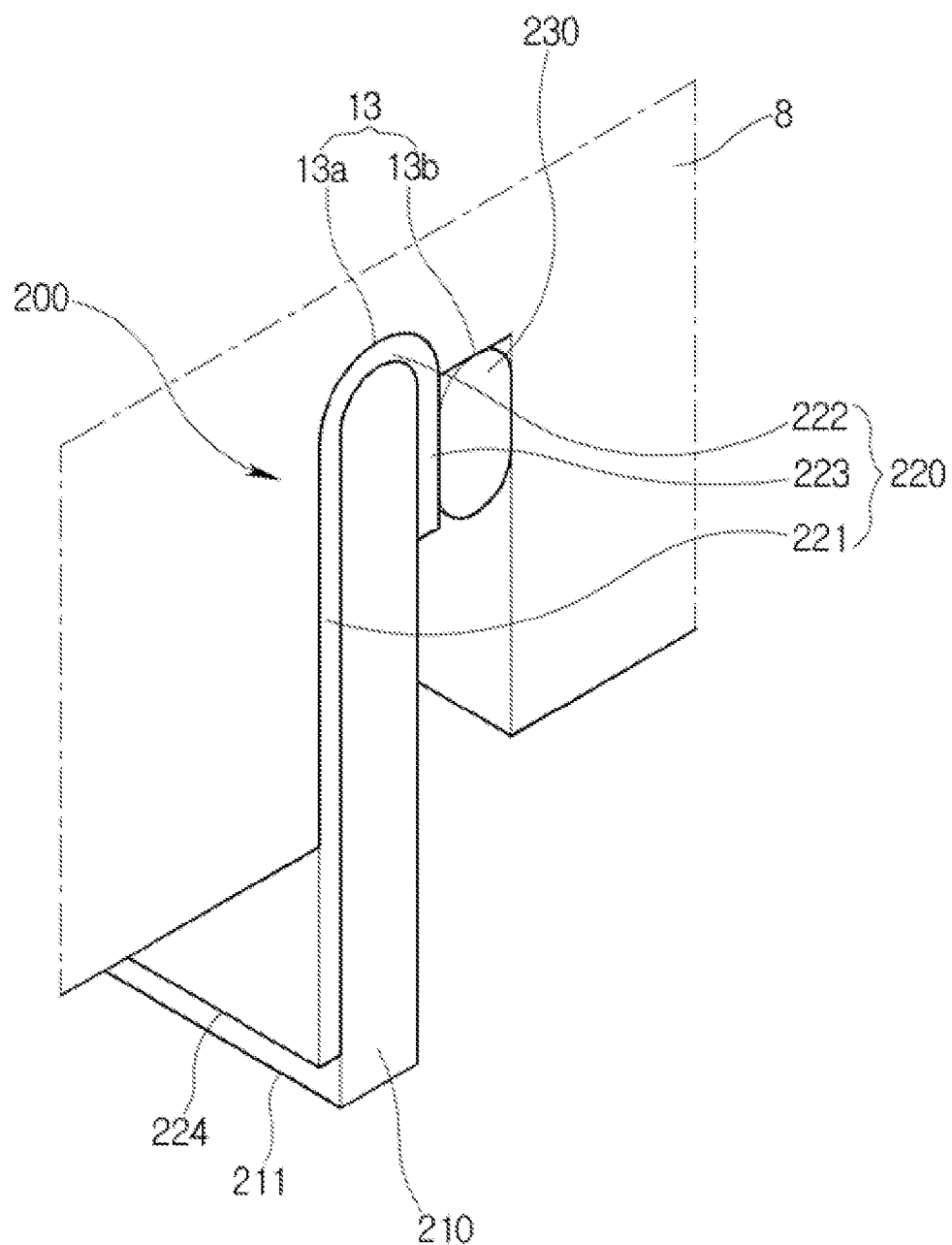
FIG. 18 is a schematic diagram of a brush seal assembly according to a sixth exemplary embodiment.

Referring to FIG. 18, basic components are similar to FIG. 15 as described above, but the present exemplary embodiment is different from the exemplary embodiment illustrated in FIG. 15 in that the mounting groove 13 is formed, including the brush insertion groove 13a and the anchoring member insertion groove 13b.

The brush seal assembly 200 includes the support strip 220 supporting one side of the brush 210 and the anchoring member 230 supporting the other side of the brush 210.

The rotor opposing surface of the sealing body 8 is provided with the mounting groove 13 in which the brush seal assembly 200 is mounted. The mounting groove 13 includes the brush insertion groove 13a into which one end of the brush 210 and one end of the support strip 220 are inserted and the anchoring member insertion groove 13b into which the anchoring member 230 is inserted, in which the brush insertion groove 13a and the anchoring member insertion groove 13b communicate with each other.

The anchoring member insertion groove 13b is formed at the one side of the brush insertion groove 13a while being stepped toward the rotor and the brush insertion groove 13a preferably has a bottom surface formed in a curved surface rounded in an arch shape to correspond to the shape of the bending part 222 of the support strip 220 to be described below.

One end of the brush 210 is inserted into the brush insertion groove 13a, and the other end thereof extends toward the outer circumferential surface of the rotor 5 (see FIG. 1) and thus the end thereof contacts the outer circumferential surface of the rotor 5. Therefore, both sides of the shaft direction of the rotor 5 based on the brush 210 are sealed with the brush 210.

In the drawing, the right pressure of the brush 210 is relatively higher than the left pressure thereof and the brush 210 reduce the leakage of the fluid in the high pressure region to the low pressure region.

The support strip 220 is provided to adhere to one surface of the brush 210, that is, one surface of the low pressure region and the support strip 220 serves to prevent the deformation of the brush 210 due to the pressure difference between both sides of the brush 210.

The support strip 220 has the ring shape of the thin plate having the "J"-letter cross section and may be made of a material which is relatively strong against heat but has elasticity as well as metal.

The support strip 220 includes the support part 221 supporting one side of the brush 210 and the bending part 221 which is bent from one end of the support part 222 to be rounded in the arch shape to enclose one end of the brush 210.

Further, to prevent the support strip 220 from being separated, the extension 223 preferably extends from one end of the bending part 222 as much as a predetermined length. That is, one end of the support strip 220 is bent to enclose one end of the brush 210 and the extension 223 of the support strip 220 partially covers the other side of the brush 210.

The other end of the support strip 220 is positioned inside the other end of the brush 210. This is to prevent the rubbing of the support strip 220 with the rotor.

The anchoring member 230 is press-fitted in the anchoring member insertion groove 13b to prevent the brush 210 and the support strip 220 from being separated.

The anchoring member 230 presses one end of the brush 20 and one end of the support strip 220 toward the inner wall of the brush insertion groove 13a to serve to allow the brush 210 and the support strip 220 to be fixedly support into the brush insertion groove 13a. For example, the anchoring member 230 may be made of the ring-shaped elastomer and extends long outward, and therefore has the wire shape in the length direction.

The support part 221 of the support strip 220 is interposed between the brush 210 and a wall surface of the brush groove 13a and the anchoring member 230 is interposed between the extension 223 of the support strip 220 and the wall surface of the anchoring member insertion groove 13b.

The bottom surface of the anchoring member insertion groove 13b protrudes at a predetermined height from one side of the bottom surface of the brush insertion groove 13a toward the rotor 5.

Preferably, the bottom surface of the anchoring member insertion groove 13b is formed to correspond to the boundary between the bending part 222 and the extension 223 of the support strip 220, and thus the anchoring member 230 press-fitted in the anchoring member insertion groove 13b intensively presses the extension 223 of the support strip 220 as compared with the foregoing exemplary embodiment, thereby fixing the brush 210 into the brush insertion groove 13a.

The support part 220 of the support strip 221 supports one side of the low pressure region of the brush 210, while the support part 220 of the support strip 221 is supported to the wall surface of the brush insertion groove 13a, thereby preventing the deformation of the brush due to the pressure difference between both sides of the brush 210 and the fluid leakage due to the deformation.

In the brush seal assembly 200, the brush 210 and the support strip 220 are inserted into the brush insertion groove 13a of the sealing body 8 and the anchoring member 240 is press-fitted in the anchoring member insertion groove 13b to allow the anchoring member 240 to press and support the brush 210 and the support strip 220, thereby completing the installation of the brush seal assembly 200. Therefore, the brush seal assembly may be easily assembled, and thereby may save manufacturing and assembling costs.

As compared with the foregoing exemplary embodiment, in the brush seal assembly 200 according to the exemplary embodiment, the anchoring member 230 intensively presses the extension 223 of the support strip 220 to allow the anchoring member to more firmly fix the brush 210 and the support strip 220.

A brush seal assembly according to a seventh exemplary embodiment will be described with reference to the accompanying drawings.

Figure 19:
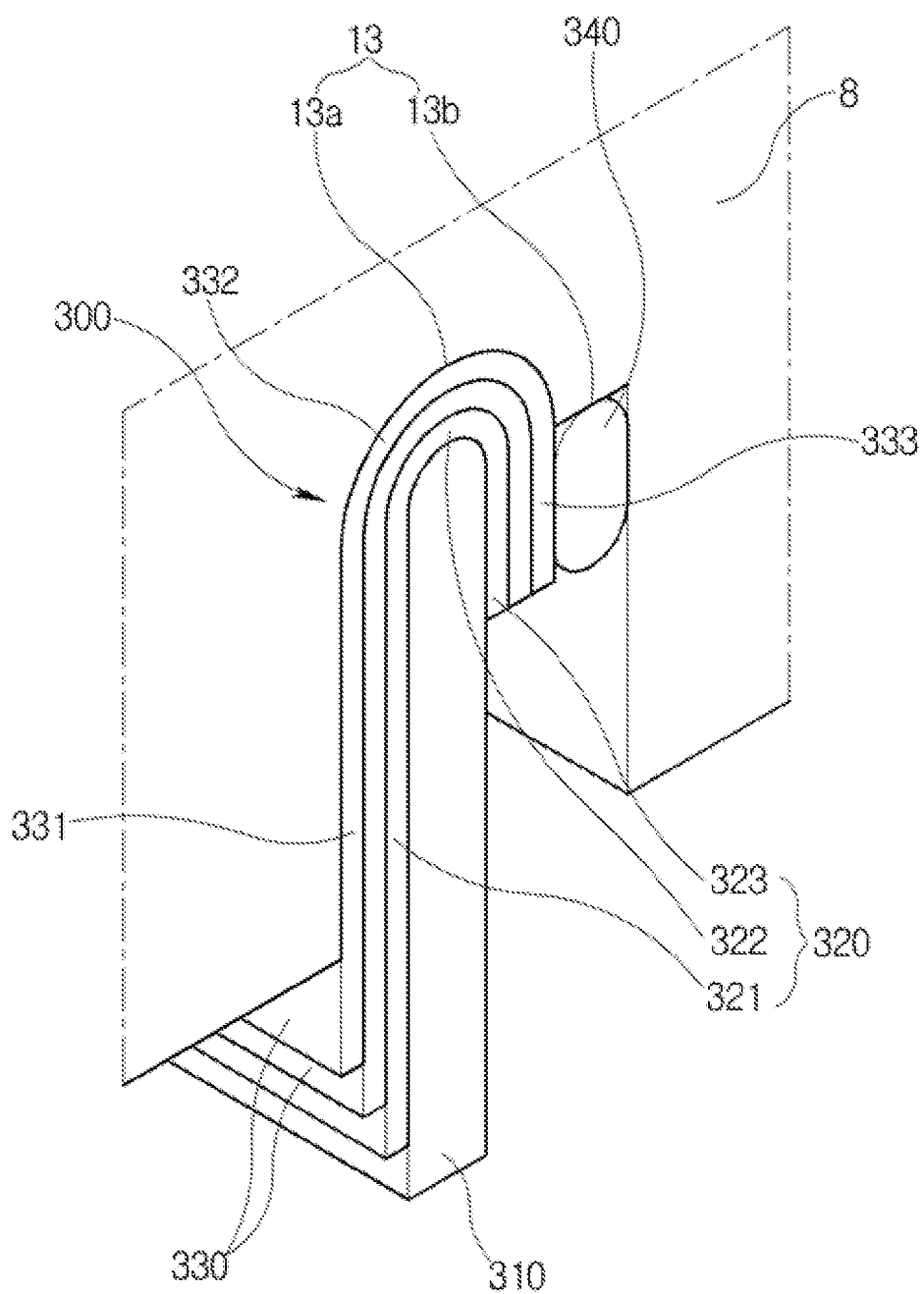
FIG. 19 is a schematic diagram of a brush seal assembly according to a seventh exemplary embodiment.

Referring to FIG. 19, the seventh exemplary embodiment is different from the foregoing exemplary embodiments in that the support strip 30 is provided in plural.

The brush seal assembly 300 includes a brush 310, a support strip 320 supporting one side of the brush 310, a plurality of auxiliary strips 330 supporting one side of the support strip 320, and an anchoring member 340 supporting the other side of the brush 310.

The rotor opposing surface of the sealing body 8 is provided with the mounting groove 13 in which the brush seal assembly 300 is mounted. The mounting groove 13 includes the brush insertion groove 13a into which one end of the brush 310, the one end of the support strip 320, and one end of the auxiliary strip 330 are inserted and the anchoring member insertion groove 13b into which the anchoring member 340 is inserted, in which the brush insertion groove 13a and the anchoring member insertion groove 13b communicate with each other.

The anchoring member insertion groove 13b is formed at the one side of the brush insertion groove 13a while being stepped toward the rotor and the brush insertion groove 13a preferably has a bottom surface formed in a curved surface rounded in an arch shape to correspond to a second bending part 332 of the auxiliary strip 330 stacked at an outermost portion of the bending part 330 of the auxiliary strip 330 to be described below.

One end of the brush 310 is inserted into the brush insertion groove 13a, and the other end thereof extends toward the outer circumferential surface of the rotor 5 (see FIG. 1) and thus the end thereof contacts the outer circumferential surface of the rotor 5. Therefore, both sides of the shaft direction of the rotor 5 based on the brush 310 are sealed with the brush 310.

In the drawing, the right pressure of the brush 310 is relatively higher than the left pressure thereof and the brush 310 reduce the leakage of the fluid in the high pressure region to the low pressure region.

The support strip 320 is provided to adhere to one surface of the brush 310, that is, one surface of the low pressure region and the plurality of auxiliary strips 330 are provided to adhere to the outer side of the support strip 320, that is, one surface of the low pressure region.

The support strip 320 and the auxiliary strip 330 has the thin plate shape having the "J"-letter cross section and may be made of a material which is relatively strong against heat but has elasticity as well as metal.

Further, the support strip 320 includes a first support part 321 supporting one side of the brush 310 and the bending part 332 which is bent from one end of the support part 321 to be rounded in the arch shape to enclose one end of the brush 310.

To prevent the support strip 320 from being separated, the first extension 323 preferably extends from one end of the bending part 1 as much as a predetermined length. That is, one end of the support strip 320 is bent to enclose one end of the brush 310 and the first extension 323 of the support strip 320 partially covers the other side of the brush 310.

The auxiliary strip 330 includes a second support part 331 supporting one side of the support strip 320 and the second bending part 332 which is bent from one end of the second support part 331 to be rounded in the arch shape to enclose one end of the support strip 320.

To prevent the auxiliary strip 330 from being separated, the extension 333 preferably extends from one end of the bending part 332 as much as a predetermined length. That is, one end of the auxiliary strip 330 is bent to enclose one end of the support strip 320 and the second extension 333 of the auxiliary strip 330 partially covers the other side of the support strip 333.

The plurality of auxiliary strips 330 are sequentially stacked at the outer side of the support strip 320 and the other end of the support strip 320 is positioned inside the other end of the brush 310 and the other end of the auxiliary strip 330 is positioned inside the other end of the support strip 320. Further, the plurality of auxiliary strips 330 are positioned inside the other end of the auxiliary strip 330 of the inside adjacent to the other end of the auxiliary strip 330 of the outside thereof.

That is, the plurality of auxiliary strips 330 are stacked stepwise so that the ends in the rotor direction of each of the second support parts 331 are positioned on one surface of the low pressure region of the support strip 320 to be more spaced apart from the rotor toward the outside of the brush 310.

At the time of installing the brush seal assembly 300, the brush 310 of the portion far away from the rotor is supported by relatively more auxiliary strips 330 and therefore the brush 310 is supported with strong stiffness and the brush 310 of the portion close to the rotor is supported with weak stiffness.

Therefore, one end of the brush 310 is firmly supported between the auxiliary strip 330 and the anchoring member 340 and the heat generation or the abrasion is more reduced even at the time of the rubbing of the other end of the support strip 320 or the auxiliary strip 330 with the rotor than before.

A brush seal assembly according to an eighth exemplary embodiment will be described with reference to the accompanying drawings.

Figure 20:
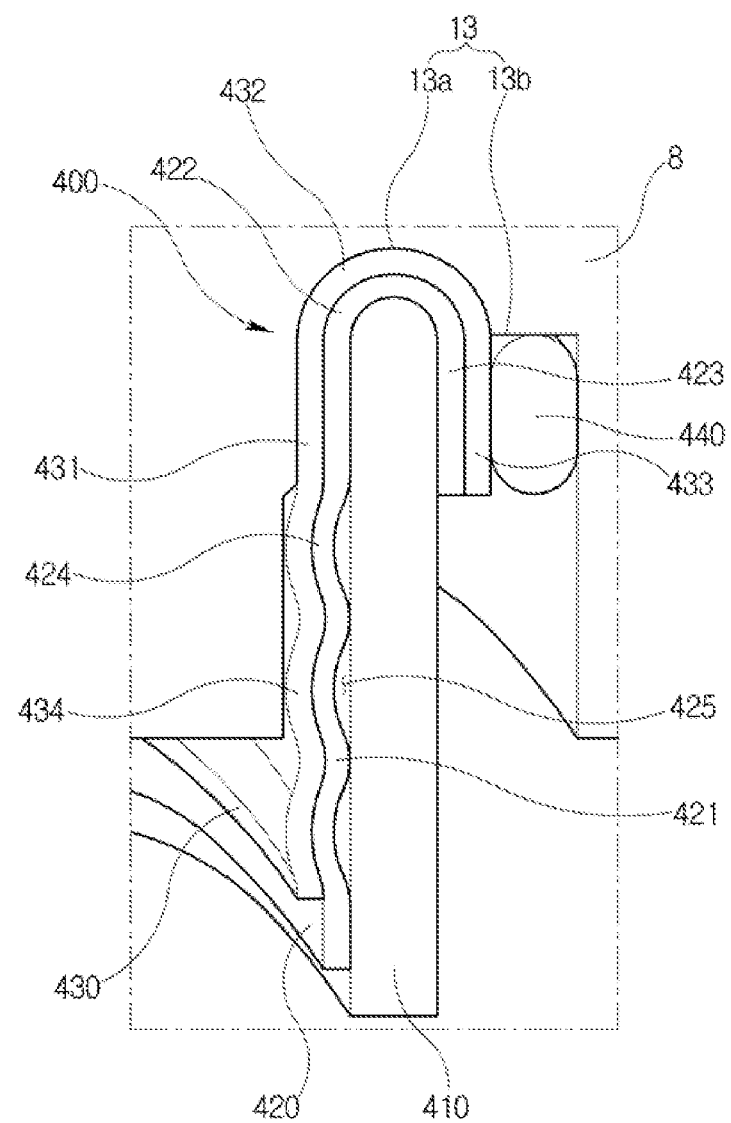
FIG. 20 is a schematic diagram of a brush seal assembly according to an eighth exemplary embodiment.

Referring to FIG. 20, the eighth exemplary embodiment is different from the foregoing exemplary embodiment in that at least one flexed part is formed in the support strip or the auxiliary strip. The brush seal assembly 400 includes a support strip 420 supporting one side of the brush 410, at least one auxiliary strips 430 supporting one side of the support strip 420, and an anchoring member 440 supporting the other side of the brush 410.

The mounting groove 13 formed in the sealing body 8 includes the brush insertion groove 13a into which one end of the brush 410, one end of the support strip 420, and one end of the auxiliary strip 430 are inserted and the anchoring member insertion groove 13b into which the anchoring member 440 is inserted. The anchoring member insertion groove 13b is formed at one side of the brush insertion groove 13a while being stepped toward the rotor and the brush insertion groove 13a preferably has a bottom surface formed in a curved surface rounded in an arch shape to correspond to the second bending part 420 of the auxiliary strip 430 stacked at an outermost portion of the support strip 420.

At least one first flexed part 424 is formed at the support strip 420 and pressure pockets 425 into which the fluid in the high pressure region is introduced are formed inside each of the first flexed parts 424.

The fluid in the high pressure region is introduced into the pressure pocket 425 through the clearance between the bristles forming the brush 410 and one surface of the low pressure region of the brush 410 is supported by the pressure of the fluid introduced into the pressure pocket 425.

The first flexed part 424 and the second flexed part 434 according to the exemplary embodiment enhance the stiffness of the support strip 420 or the auxiliary strip 430.

Preferably, at least one first flexed part 424 is formed at the first support part 421 of the support strip 420, and at least one second flexed part 434 is formed even at the second support part 431 of the auxiliary strip 430 to allow the auxiliary strip 430 to adhere to the support strip 420.

Further, the plurality of first flexed parts 424 and second flexed parts 434 are spaced apart from each other in the radius direction of the support strip 420 and the auxiliary strip 430 and thus extends long along the circumferential direction.

Standards like the number and the shape, the protruding height, a pitch, and the like of first flexed parts 424 and second flexed parts 434 may be appropriately selected if necessary and the plurality of flexed parts may be continuously formed along the radius direction and may be formed to be spaced apart from each other.

Further, the flexed part is formed at the support strip supporting one surface of the low pressure region of the brush and the configuration in which the brush is supported by the pressure of the pressure pocket may also be applied to another exemplary embodiment.

A brush seal assembly according to a ninth exemplary embodiment will be described with reference to the accompanying drawings. For reference, the overlapping description with the foregoing exemplary embodiments will be omitted.

Figure 21:
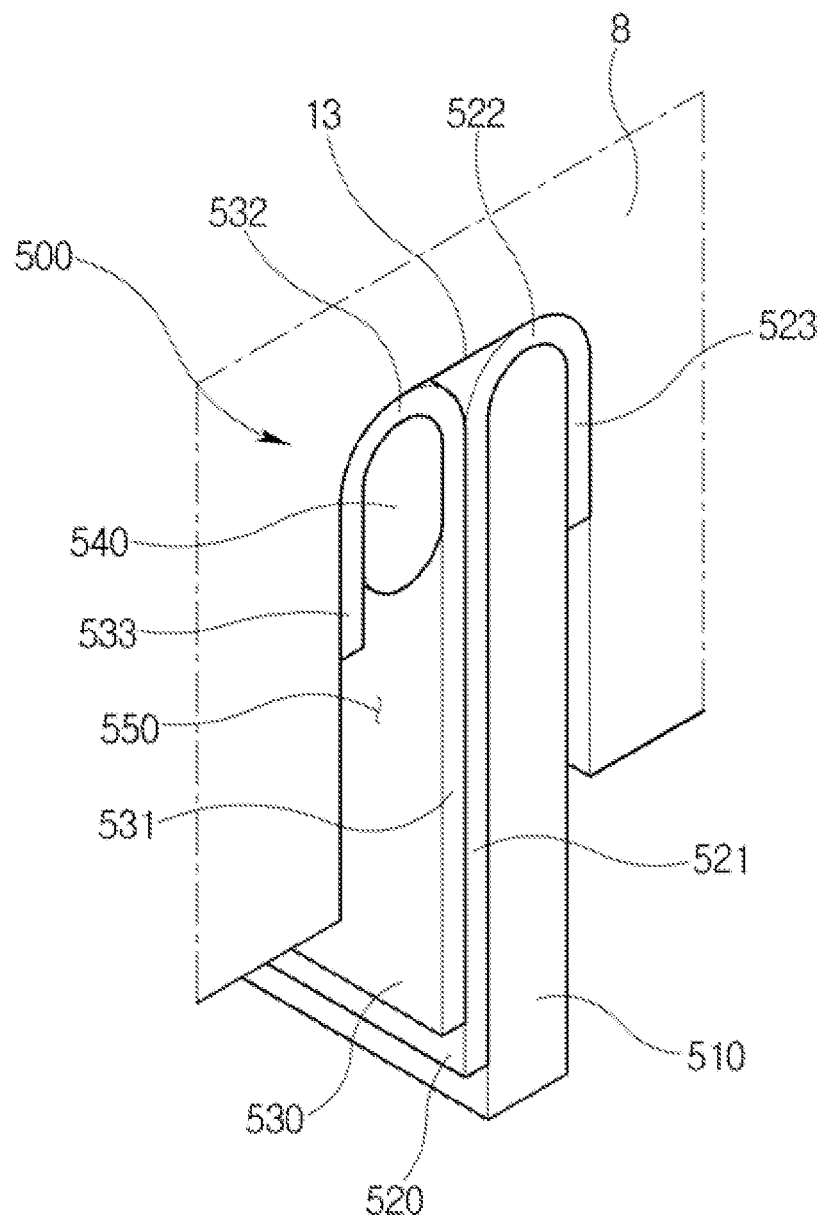
FIG. 21 is a schematic diagram of a brush seal assembly according to a ninth exemplary embodiment.

Referring to FIG. 21, the other end of a support strip 520 is positioned inside the other end of the brush 510. This is to prevent the rubbing of the support strip 520 with the rotor 5 and the end of the support strip 520 is positioned at a point which is more spaced apart from the outer circumferential surface of the rotor 5 than the end of the brush 510.

The support strip 520 which has a thin plate shape has elasticity and therefore is easily elastically deformed when it contacts with the rotor. Therefore, it may reduce the heat generation and the abrasion due to the rubbing than the existing plate and may increase the sealing efficiency by reducing the gap from the rotor than the existing plate.

One end of the brush 510 and one end of the support strip 520 are inserted into one side of the mounting groove 13 and the anchoring member 540 is press-fitted in the mounting groove 13 to press the upper end of the first support part 521 of the support strip 520, thereby preventing the brush 510 and the support strip 520 from being separated.

The anchoring member 540 presses the brush 510 and the support strip 520 toward the inner wall of the mounting groove 13 to serve to allow the brush 510 and the support strip 520 to be fixedly support into the mounting groove 13. For example, the anchoring member 540 may be made of the ring-shaped elastomer and extends long outward, and therefore has the wire shape in the length direction.

In this case, the first support part 521 of the support strip 520 is interposed between the anchoring member 540 and the brush 510 and the anchoring member 540 is interposed between the first support part 521 of the support strip 520 and the inner wall of the mounting groove 13.

As the anchoring member 540 is interposed between the inner wall of the mounting groove 13 and the support strip 520, a space part 550 is formed between the support strip 520 and the inner wall of the mounting groove 13.

The fluid in the low pressure region is introduced into the space part 550 between the support strip 520 and the inner wall of the mounting groove 13 to press the pressure to the first support part 521 of the support strip 520, thereby supporting one surface of the low pressure of the brush 510 together with the support strip 520.

At least one auxiliary strip 530 may be stepwise stacked on the outer side of the support strip 520.

The auxiliary strip 530 includes a second support part 531 supported to the first support part 521 of the support strip 520, a second bending part 532 bent to be rounded in an arch form to enclose one side of the anchoring member 540, and a second extension 533 extending from one end of the second bending part 532.

The brush 510, the first support part 521, and the second support part 531 are stepwise stacked so that the ends thereof are positioned to be more spaced apart from the rotor toward the outer side of the brush 510.

According to the exemplary embodiment, as one surface of the low pressure region of the brush 510 is supported by the support strip 520, and at the same time the support strip 520 is supported by the fluid in the low pressure region introduced into the space part 550, it is possible to prevent the abrasion due to the rubbing of the support strip 520 or the auxiliary strip 530 with the inner wall of the mounting groove 13.

A brush seal assembly according to a tenth exemplary embodiment will be described with reference to the accompanying drawings. For reference, the overlapping description with the foregoing exemplary embodiments will be omitted.

Figure 22:
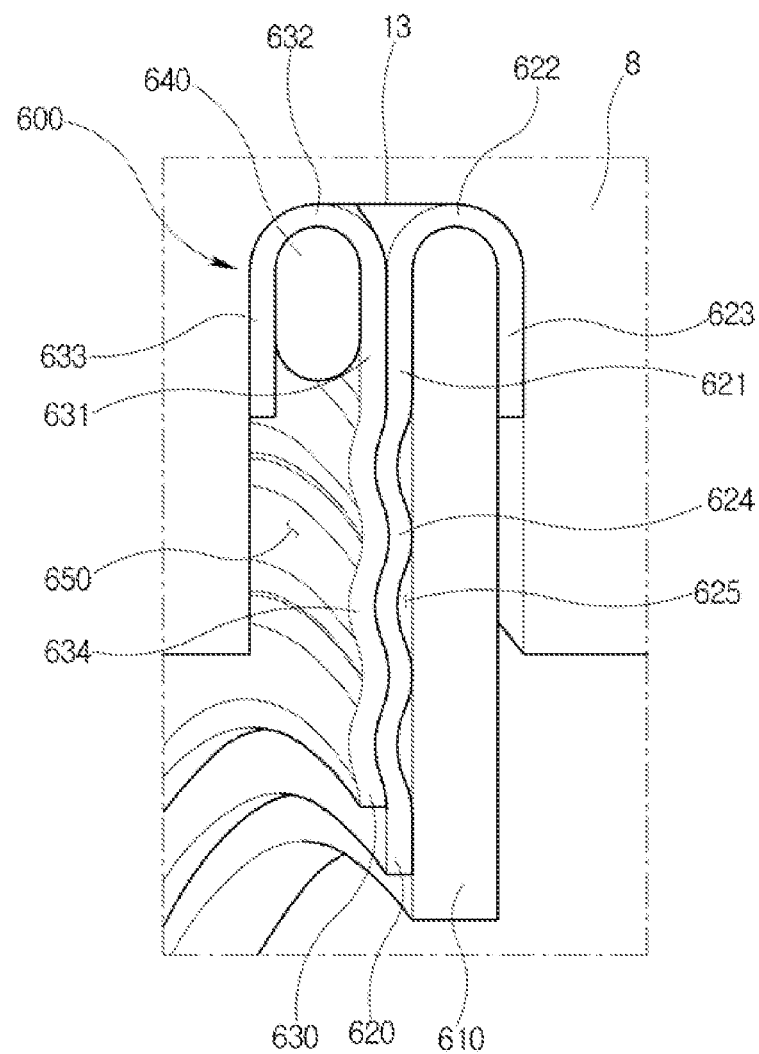
FIG. 22 is a schematic diagram of a brush seal assembly according to a tenth exemplary embodiment.

Referring to FIG. 22, basic components of a brush seal assembly 600 are similar to those the foregoing exemplary embodiments but the brush seal assembly 600 is different from the foregoing exemplary embodiments in that at least one flexed part is formed at the support strip or the auxiliary strip.

The brush seal assembly 600 includes a brush 610, a support strip 620 supporting one side of the brush 610, and an anchoring member 640 supporting one side of the support strip 620. One end of the brush 610 is inserted into the mounting groove 13 of the sealing body 8 and the other end thereof extends toward the outer circumferential surface of the rotor 5 and thus the end thereof contacts the outer circumferential surface of the rotor. Therefore, both sides of the shaft direction of the rotor 5 based on the brush 610 are sealed with the brush 610.

The support strip 620 is provided to adhere to one surface of the brush 610, that is, one surface of the low pressure region and the support strip 620 serves to prevent the deformation of the brush 610 due to the pressure difference between both sides of the brush 610.

The support strip 620 includes a first support part 621 supporting one side of the brush 610 and a first bending part 622 which is bent from one end of the support part 621 to be rounded in the arch shape to enclose one end of the brush 610.

Further, to prevent the support strip 620 from being separated, the first extension 623 preferably extends from one end of the first bending part 622 as much as a predetermined length. That is, one end of the support strip 620 is formed to be bent to enclose one end of the brush 610 and the first extension 623 of the support strip 620 partially covers the other side of the brush 610.

The other end of the support strip 620 is positioned inside the other end of the brush 610. This is to prevent the rubbing of the support strip 620 with the rotor and the end of the support strip 620 is positioned at a point which is more spaced apart from the outer circumferential surface of the rotor 5 than the end of the brush 610.

The support strip 620 according to the exemplary embodiment which has a thin plate shape has elasticity and therefore is easily elastically deformed when it contacts with the rotor. Therefore, it may reduce the heat generation and the abrasion due to the rubbing than the existing plate and may increase the sealing efficiency by reducing the gap from the rotor than the existing plate.

One end of the brush 610 and one end of the support strip 620 are inserted into one side of the mounting groove 13 and the anchoring member 640 is press-fitted in the mounting groove 13 to press the upper end of the first support part 620 of the support strip 620, thereby preventing the brush 610 and the support strip 621 from being separated.

The anchoring member 640 presses the brush 610 and the support strip 620 toward the inner wall of the mounting groove 13 to serve to allow the brush 610 and the support strip 620 to be fixedly support into the mounting groove 13. For example, the anchoring member 640 may be made of the ring-shaped elastomer and extends long outward, and therefore has the wire shape in the length direction.

The first support part 620 of the support strip 621 is interposed between the anchoring member 640 and the brush 610 and the anchoring member 640 is interposed between the first support part 620 of the support strip 621 and the inner wall of the mounting groove 13.

As the anchoring member 640 is interposed between the inner wall of the mounting groove 13 and the support strip 620, a space part 650 is formed between the support strip 620 and the inner wall of the mounting groove 13.

The fluid in the low pressure region is introduced into the space part 650 between the support strip 620 and the inner wall of the mounting groove 13 formed by the press-fitting of the anchoring member 640 and the pressure is applied to the first support part 621 of the support strip 620 to support the low pressure side of the brush 610 along with the support strip 620.

When the support strip 620 is supported by the fluid in the low pressure region introduced into the space part 650, it is possible to prevent the abrasion due to the rubbing of the support strip 620 or the auxiliary strip 630 with the inner wall of the mounting groove 13.

At least one auxiliary strip 630 may be stepwise stacked on the outer side of the support strip 620.

The auxiliary strip 630 includes a second support part 631 supported to the first support part 620 of the support strip 621, a second bending part 632 bent to be rounded in an arch form to enclose one side of the anchoring member 640, and a second extension 632 extending from one end of the second bending part 632.

Further, the brush 610, the first support part 621, and the second support part 631 are stacked in the form in which the ends thereof are positioned to be more spaced apart from the rotor toward the outer side of the brush 610, for example, in a step form.

At least one flexed part is formed at the support strip 620, in which the flexed part is provided with a first flexed part 624 and at least one second flexed part 634 to have the first flexed part 624 adhere to the second support part 631 of the auxiliary strip 630.

The first flexed part 624 is to form a pressure pocket 625 between one surface in the low pressure region of the brush 610 and the support strip 620

The fluid in the high pressure region is introduced into the pressure pocket 625 through the clearance between the bristles and the fluid in the high pressure region introduced into the pressure pocket 625 presses one surface of the low pressure region of the brush 610 to compensate for the pressure difference between both sides of the brush 610.

Meanwhile, the first flexed part 624 and the second flexed part 634 may enhance the stiffness of the support strip 620 and the auxiliary strip 630 and extends long in plural while being spaced apart from each other in the radius direction of the support strip 620 and the auxiliary strip 630. Standard like the number, the protruding height, the pitch, and the like of first flexed parts 624 and second flexed parts 634 may be appropriately selected if necessary and the plurality of flexed parts each may be continuously formed along the radius direction and may be formed to be spaced apart from each other.

A brush seal assembly according to an eleventh exemplary embodiment will be described with reference to the accompanying drawings.

Figure 23:
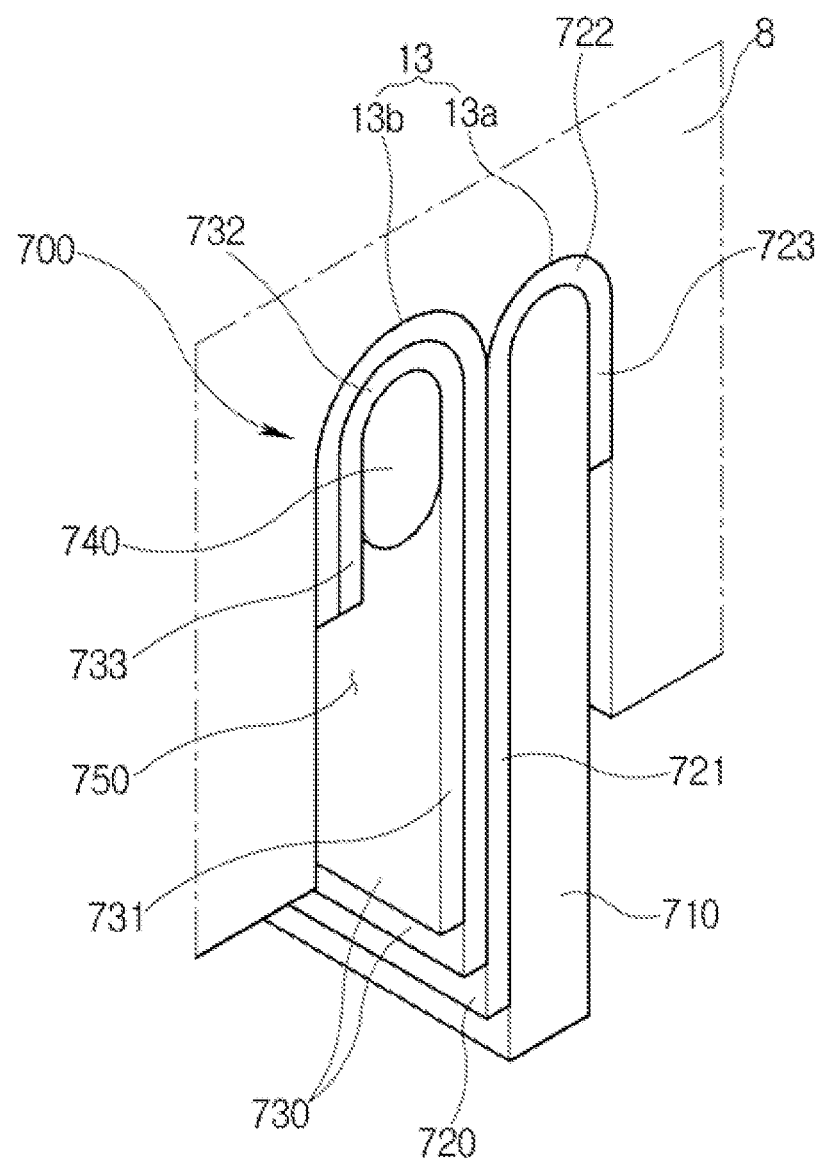
FIG. 23 is a schematic diagram of a brush seal assembly according to an eleventh exemplary embodiment.

Referring to FIG. 23, a brush seal assembly 700 includes a brush 710, a support strip 720 supporting one side of the brush 710, and an anchoring member 740 supporting one side of the support strip 720.

The rotor opposing surface of the sealing body 8 is provided with the mounting groove 13 in which the brush seal assembly 700 is mounted.

The mounting groove 13 includes the brush insertion groove 13a into which one end of the brush 710 and one end of the support strip 720 are inserted and the anchoring member insertion groove 13b into which the anchoring member 740 is inserted, in which the brush insertion groove 13a and the anchoring member insertion groove 13b communicate with each other.

The brush insertion groove 13a has the bottom surface formed in a curved surface rounded in an arch shape to correspond to a shape of a first bending part 722 of the support strip 720 and the anchoring member insertion groove 13b has a bottom surface rounded in an arch shape to correspond to an anchoring member 740 or a shape of a second bending part 732 of the outermost auxiliary strip 730 enclosing the anchoring member 740.

One end of the brush 710 is inserted into the brush insertion groove 13a, and the other end thereof extends toward the outer circumferential surface of the rotor 5 (see FIG. 1) and thus the end thereof contacts the outer circumferential surface of the rotor 5. Therefore, both sides of the shaft direction of the rotor 5 based on the brush 710 are sealed with the brush 710.

In the drawing, the right pressure of the brush 710 is relatively higher than the left pressure thereof and the brush 710 reduce the leakage of the fluid in the high pressure region to the low pressure region.

The support strip 720 is provided to adhere to one surface of the brush 710, that is, one surface of the low pressure region and the support strip 720 serves to prevent the deformation of the brush 710 due to the pressure difference between both sides of the brush 710.

The support strip 720 includes a first support part 721 supporting one side (one surface of the low pressure region) of the brush 710 and a first bending part 721 which is bent from one end of the support part 722 to be rounded in the arch shape to enclose one end of the brush 710.

To prevent the support strip 720 from being separated, the first extension 723 preferably extends from one end of the bending part 1 as much as a predetermined length. That is, one end of the support strip 720 is formed to be bent to enclose one end of the brush 710 and the first extension 723 of the support strip 720 partially covers the other side of the brush 710.

The other end of the support strip 720 is positioned inside the other end of the brush 710. This is to prevent the rubbing of the support strip 720 with the rotor and the end of the support strip 720 is positioned at a point which is more spaced apart from the outer circumferential surface of the rotor 5 than the end of the brush 710.

One end of the brush 710 and one end of the support strip 720 are inserted into the brush insertion groove 13a and the anchoring member 740 is press-fitted in the anchoring member insertion groove 13b to press the upper end of the first support part 720 of the support strip 720, thereby preventing the brush 710 and the support strip 720 from being separated.

The anchoring member 740 presses the brush 710 and the support strip 720 toward the inner wall of the brush insertion groove 13a to serve to allow the brush 710 and the support strip 720 to be fixedly support into the brush insertion groove 13a. For example, the anchoring member 740 may be made of the ring-shaped elastomer and extends long outward, and therefore has the wire shape in the length direction.

The first support part 721 of the support strip 720 is interposed between the anchoring member 740 and the brush 710 and the anchoring member 740 is interposed between the first support part 721 of the support strip 720 and the inner wall of the anchoring member insertion groove 13b. The anchoring member 740 press-fitted in the anchoring member insertion groove 13b intensively presses the upper end of the first support part 721 of the support strip 720 to fix the brush 710 and the support strip 720 in the brush insertion groove 13a.

As the anchoring member 740 is interposed between the inner wall of the anchoring member insertion groove 13b and the support strip 720, a space part 750 is formed between the support strip 720 and the inner wall of the anchoring member insertion groove 13b.

The space part 750 is formed between the support strip 720 formed by the press-fitting of the anchoring member 740 and the inner wall of the anchoring member insertion groove 13b to apply the pressure to the first support part 721 of the support strip 720, thereby supporting the one surface of the low pressure region of the brush 710 together with the support strip 720. Further, at least one auxiliary strip 730 may be stepwise stacked on the outer side of the support strip 720.

The auxiliary strip 730 includes a second support part 731 supported to the first support part 720 of the support strip 721, a second bending part 732 bent to be rounded in an arch form to enclose one side of the anchoring member 740, and a second extension 733 extending from one end of the second bending part 732.

The brush 710, the first support part 721, and the second support part 731 are stacked in the form in which the ends thereof are positioned to be more spaced apart from the rotor toward the outer side of the brush 710, for example, in a step form.

The anchoring member 740 intensively presses the upper end of the first support part 721 of the support strip 720 to fix the brush 710 and the support strip 720 in the brush insertion groove 13a. As the anchoring member 740 is interposed between the inner wall of the anchoring member insertion groove 13b and the support strip 720, a space part 750 is formed between the support strip 720 and the inner wall of the anchoring member insertion groove 13b.

The space part 750 is formed between the support strip 720 formed by the press-fitting of the anchoring member 740 and the inner wall of the anchoring member insertion groove 13b to apply the pressure to the first support part 721 of the support strip 720, thereby supporting the one surface of the low pressure region of the brush 710 together with the support strip 720.

Further, at least one auxiliary strip 730 may be stepwise stacked on the outer side of the support strip 720. The auxiliary strip 730 includes the second support part 731 supported to the first support part 720 of the support strip 721, the second bending part 732 bent to be rounded in an arch form to enclose one side of the anchoring member 740, and the second extension 733 extending from one end of the second bending part 732.

The brush 710, the first support part 721, and the second support part 731 are stacked in the form in which the ends thereof are positioned to be more spaced apart from the rotor toward the outer side of the brush 710, for example, in a step form.

The anchoring member 740 intensively presses the upper end of the first support part 721 of the support strip 720 to fix the brush 710 and the support strip 720 in the brush insertion groove 13a.

Further, as the support strip 720 and the auxiliary strip 730 are stepwise stacked on the one surface of the low pressure region of the brush 710, it is possible to more reduce the abrasion than before even at the time of the rubbing of the other end of the support strip 720 or the other end of the auxiliary strip 730 with the rotor.

Further, as the one surface of the low pressure region of the brush 710 is supported by the support strip 720 and the auxiliary strip 730, and at the same time are supported by the fluid in the low pressure region introduced into the space part 750, it is possible to prevent the abrasion due to the rubbing of the support strip 720 or the auxiliary strip 730 with the inner wall of the mounting groove 13.

According to the brush seal assembly in accordance with the exemplary embodiments, the thin support strip may support one surface of the brush to reduce the heat generation and the abrasion due to the rubbing with the rotor.

Therefore, it may reduce the fluid leakage by reducing the gap between the support strip supporting the brush and the rotor and may improve the sealing efficiency and the turbine efficiency.

Further, it is possible to provide the brush seal assembly having a structure that may be easily assemble and may have price competitiveness.

It should be understood that the embodiments may be changed and modified in various ways by those skilled in the art, without departing from the spirit and scope described in the claims.

What is claimed is:

1. A brush seal assembly, comprising:
   a diaphragm that includes a brush insertion groove;
   a brush configured to have a first end disposed in the brush insertion groove of the diaphragm and a second end protruding toward a rotor;
   a ring shaped support plate disposed adjacent to the brush, the ring shaped support plate being used to support a side of the brush, and the ring shaped support plate including a first portion disposed in the brush insertion groove of the diaphragm and a second portion extending out of the brush insertion groove; and a first back plate configured to support a side of the ring shaped support plate and disposed in the brush insertion groove of the diaphragm, the first back plate including a portion extending out of the brush insertion groove that is in contact with the second portion of the ring shaped support plate, wherein the ring shaped support plate includes:
- a first support strip portion facing to the brush, and the first support strip portion including a material having an elastic restoring force, and
- a second support strip portion facing to the first back plate, and the second support strip portion including a different type of material other than the material having the elastic restoring force.

2. The brush seal assembly of claim 1, further comprising: a second back plate configured to support a second side of the brush.

3. The brush seal assembly of claim 1, wherein the support plate includes at least one flexed part.

4. The brush seal assembly of claim 3, wherein a pressure pocket is formed between the flexed part and the brush.

5. The brush seal assembly of claim 1, wherein the support plate includes:
- a support part configured to support a first side of the brush,
- a bending part bent to enclose the first end of the brush in the end of the support part, and
- an extension configured to extend from an end of the bending part to partially cover the second side of the brush.

6. The brush seal assembly of claim 5, wherein the support part includes at least one flexed part.

7. The brush seal assembly of claim 6, wherein a pressure pocket is formed between the flexed part and the brush.

8. The brush seal assembly of claim 6, wherein the second side of the brush is interposed with an anchoring member configured to press and support the extension onto the brush.

9. The brush seal assembly of claim 1, wherein:
- a side of the brush insertion groove is provided with an anchoring member insertion groove into which the anchoring member is inserted, and
- the anchoring member insertion groove is stepped from the side of the brush insertion groove toward the rotor.

10. The brush seal assembly of claim 1, wherein:
The ring shaped support plate includes a first support strip and a second support strip, the first support strip including the material having the elastic restoring force, and the second support strip including a different type of material other than the material having the elastic restoring force.

11. The brush seal assembly of claim 9, wherein the anchoring member has a rectangular shape and includes:
- a first surface adhered to an outer circumferential surface of an extension extending from the support strip, and
- a second surface fitted in an anchoring member insertion groove.

12. A brush seal assembly, comprising:
a diaphragm that includes a side having a brush insertion groove;

a brush configured to have a first end disposed in the side of the diaphragm and a second end protruding toward a rotor;

a support strip configured to support a first side of the brush;

a first back plate configured to support a side of the support strip; and a second back plate configured to support a second side of the brush, where in the first end of the brush and an end of the support strip are welded to an outer surface of the brush insertion groove, the first side of the brush and a first side of the support strip are supported by the first back plate, and the second side of the brush and a second side of the support strip are supported by the second back plate, wherein the support strip includes:
- a first support strip portion facing to the brush, and the first support strip portion including a material having an elastic restoring force, and
- a second support strip portion facing to the first back plate, and the second support strip portion including a different type of material other than the material having the elastic restoring force.

* * * * *